US009776511B2

(12) United States Patent
Brooks et al.

(10) Patent No.: US 9,776,511 B2
(45) Date of Patent: Oct. 3, 2017

(54) VEHICLE ALIGNMENT SYSTEMS FOR LOADING DOCKS

(71) Applicants: Andrew Brooks, Thiensville, WI (US); Bradley J. Stone, Port Washington, WI (US); Jason Senfleben, Hartford, WI (US); Jeff Logic, Racine, WI (US); Matthew Sveum, Wauwatosa, WI (US)

(72) Inventors: Andrew Brooks, Thiensville, WI (US); Bradley J. Stone, Port Washington, WI (US); Jason Senfleben, Hartford, WI (US); Jeff Logic, Racine, WI (US); Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/752,332

(22) Filed: Jun. 26, 2015

(65) Prior Publication Data

US 2016/0009177 A1 Jan. 14, 2016

Related U.S. Application Data

(60) Provisional application No. 62/022,074, filed on Jul. 8, 2014.

(51) Int. Cl.
*B60Q 1/26* (2006.01)
*B60K 35/00* (2006.01)
(Continued)

(52) U.S. Cl.
CPC ............ *B60K 35/00* (2013.01); *B65G 69/006* (2013.01); *B60K 2350/1088* (2013.01);
(Continued)

(58) Field of Classification Search
None
See application file for complete search history.

(56) References Cited

U.S. PATENT DOCUMENTS 5,191,328 A 3/1993 Nelson
5,440,772 A 8/1995 Springer et al.
(Continued)

FOREIGN PATENT DOCUMENTS

EP 2206664 7/2010
EP 2360110 8/2011
(Continued)

OTHER PUBLICATIONS

Crawford, "Crawford Docking Equipment Product Datasheet," last retrieved from [http://www.crawfordsolutions.com.sa/AAES/crawfordsolutionsCOM/EN/Products/Docking/Dock%20levellers/Docking%20equipment/1.%20Product%20datasheet/PD_DEQP_ALL_EN_ORG.pdf] on Jun. 16, 2015, 16 pages.
(Continued)

*Primary Examiner* — Adolf Dsouza
(74) *Attorney, Agent, or Firm* — Hanley, Flight & Zimmerman, LLC

(57) ABSTRACT

Example vehicle alignment systems for use at loading docks are disclosed herein. An example vehicle alignment system includes a sensor system to detect a surface of a vehicle, where the sensor system obtains a feedback signal representative of a spatial orientation of the detected surface relative to a reference as the vehicle approaches a doorway of the loading dock. A controller detects a threshold deviation in the spatial orientation of the detected surface of the vehicle relative to the reference based on the feedback signal. A display varies an output signal in response to the detected deviation in the spatial orientation of the detected surface relative to the reference.

24 Claims, 25 Drawing Sheets

(51) Int. Cl.
*B65G 69/00* (2006.01)
*G01S 13/93* (2006.01)

(52) U.S. Cl.
CPC ............... *G01S 2013/9314* (2013.01); *G01S 2013/9317* (2013.01); *G01S 2013/9364* (2013.01); *G01S 2013/9367* (2013.01)

(56) References Cited

U.S. PATENT DOCUMENTS

| | | |
|---|---|---|
| 6,205,721 B1 | 3/2001 | Ashelin et al. |
| 6,233,885 B1 | 5/2001 | Hoffmann et al. |
| 6,311,352 B1 | 11/2001 | Springer |
| 7,185,463 B2 | 3/2007 | Borgerding |
| 7,213,285 B2 | 5/2007 | Mitchell |
| 8,307,588 B2 | 11/2012 | Hoffmann et al. |
| 8,616,826 B2 | 12/2013 | Cotton et al. |
| 8,678,736 B2 | 3/2014 | Anderson et al. |
| 9,290,336 B2 | 3/2016 | Ballester |
| 2003/0145535 A1* | 8/2003 | DiBiase ............... B65G 69/003 52/173.2 |
| 2006/0266275 A1 | 11/2006 | DiBiase et al. |
| 2010/0146719 A1 | 6/2010 | Swessel et al. |
| 2013/0291455 A1* | 11/2013 | Wiegel ................ B65G 69/003 52/173.1 |

FOREIGN PATENT DOCUMENTS

| | | |
|---|---|---|
| EP | 2373558 | 10/2011 |
| EP | 2865622 | 4/2015 |
| WO | 2008008699 | 1/2008 |
| WO | 2010064989 | 6/2010 |

OTHER PUBLICATIONS

International Searching Authority, "International Search Report," issued in connection with Application No. PCT/US2015/038311, Oct. 16, 2015, 3 pages.

International Searching Authority, "Written Opinion," issued in connection with Application No. PCT/US2015/038311, Oct. 16, 2015, 6 pages.

"Redacted Proposal Dock Equipment Automation," Jul. 9, 2013, 10 pages.

International Searching Authority, "International Preliminary Report on Patentability," issued in connection with PCT Patent Application No. PCT/US2015/038311, Jan. 19, 2017, 8 pages.

* cited by examiner

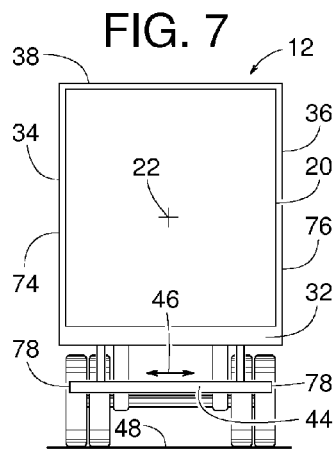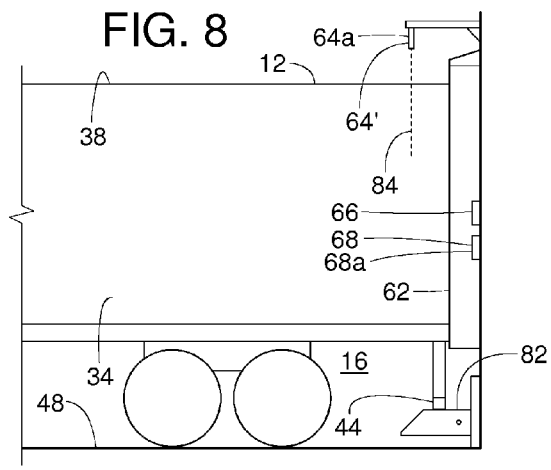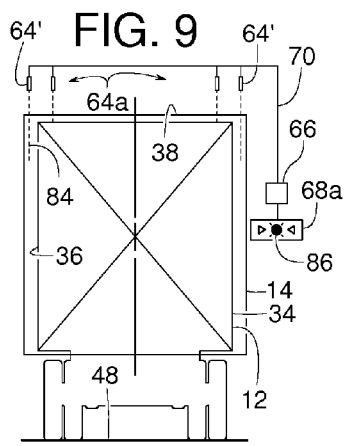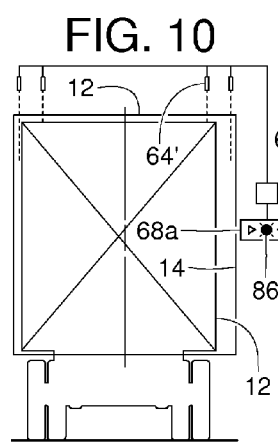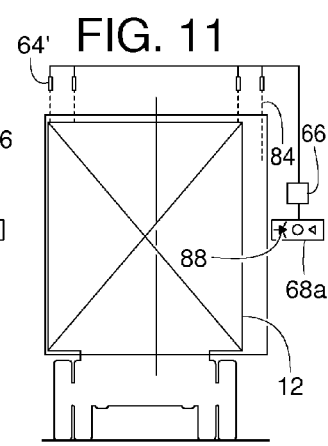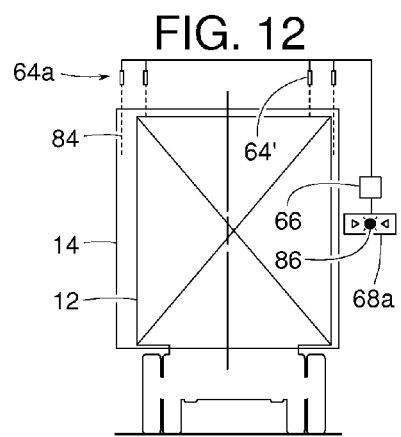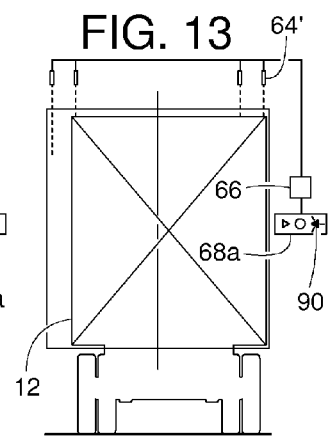

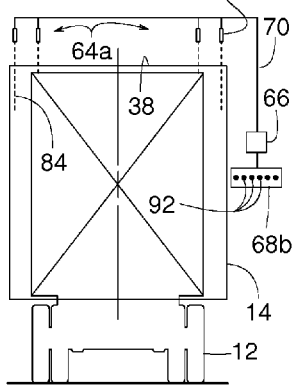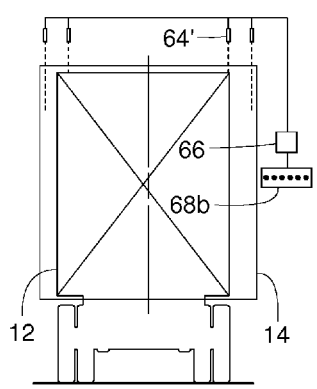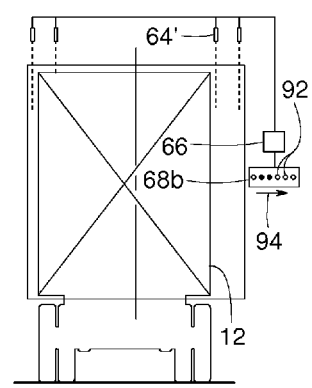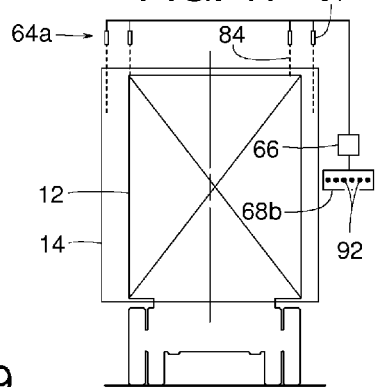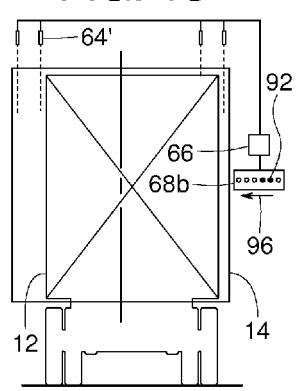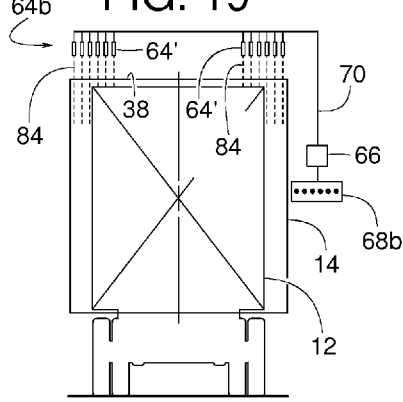

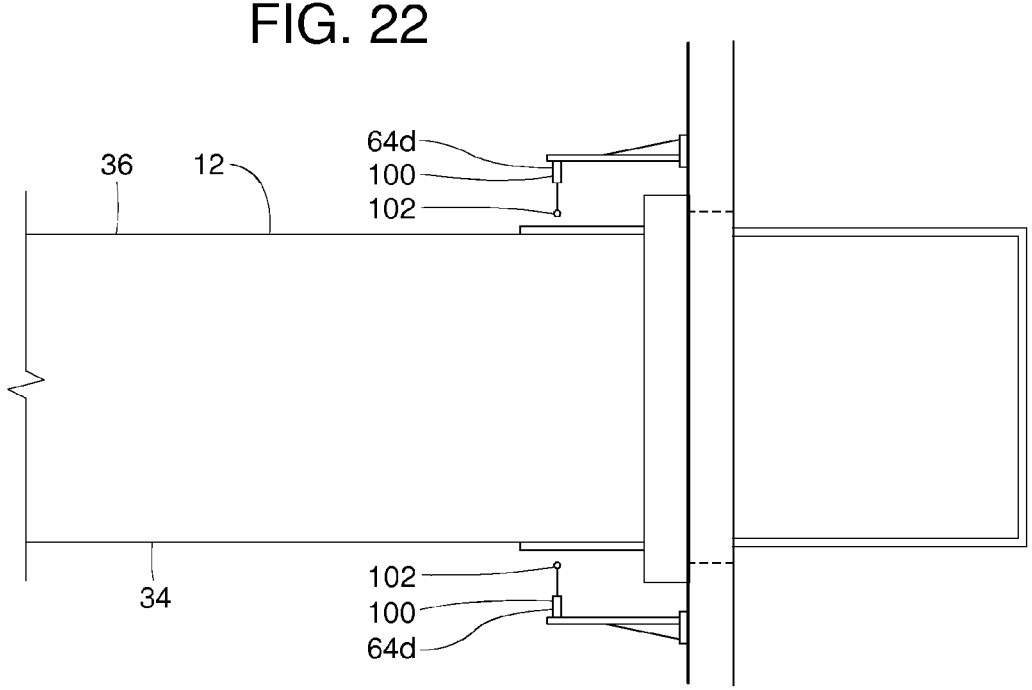
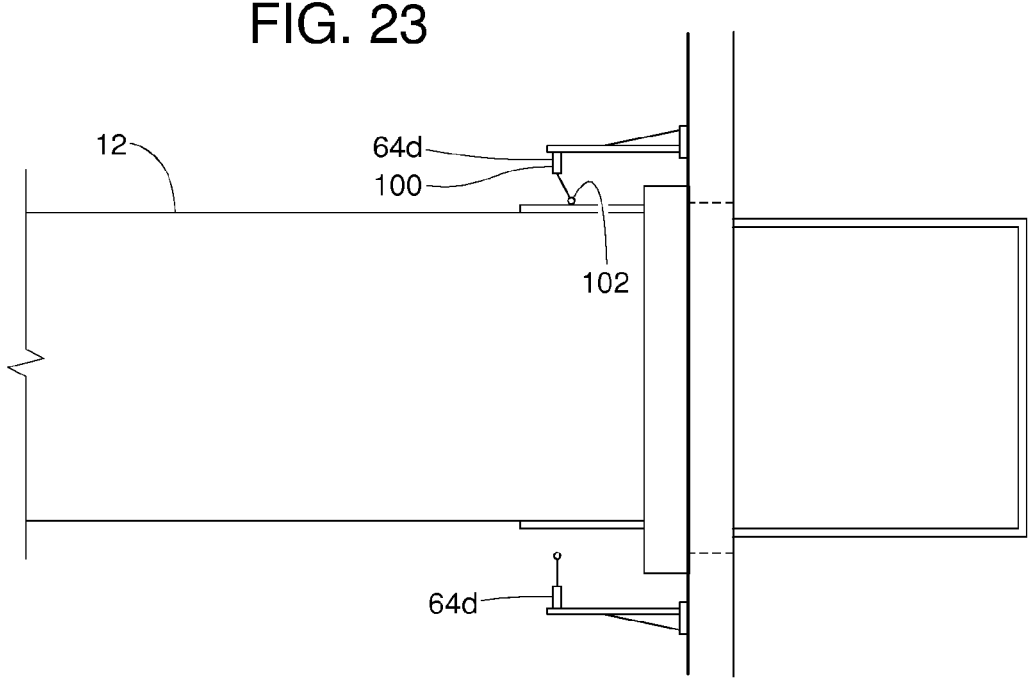

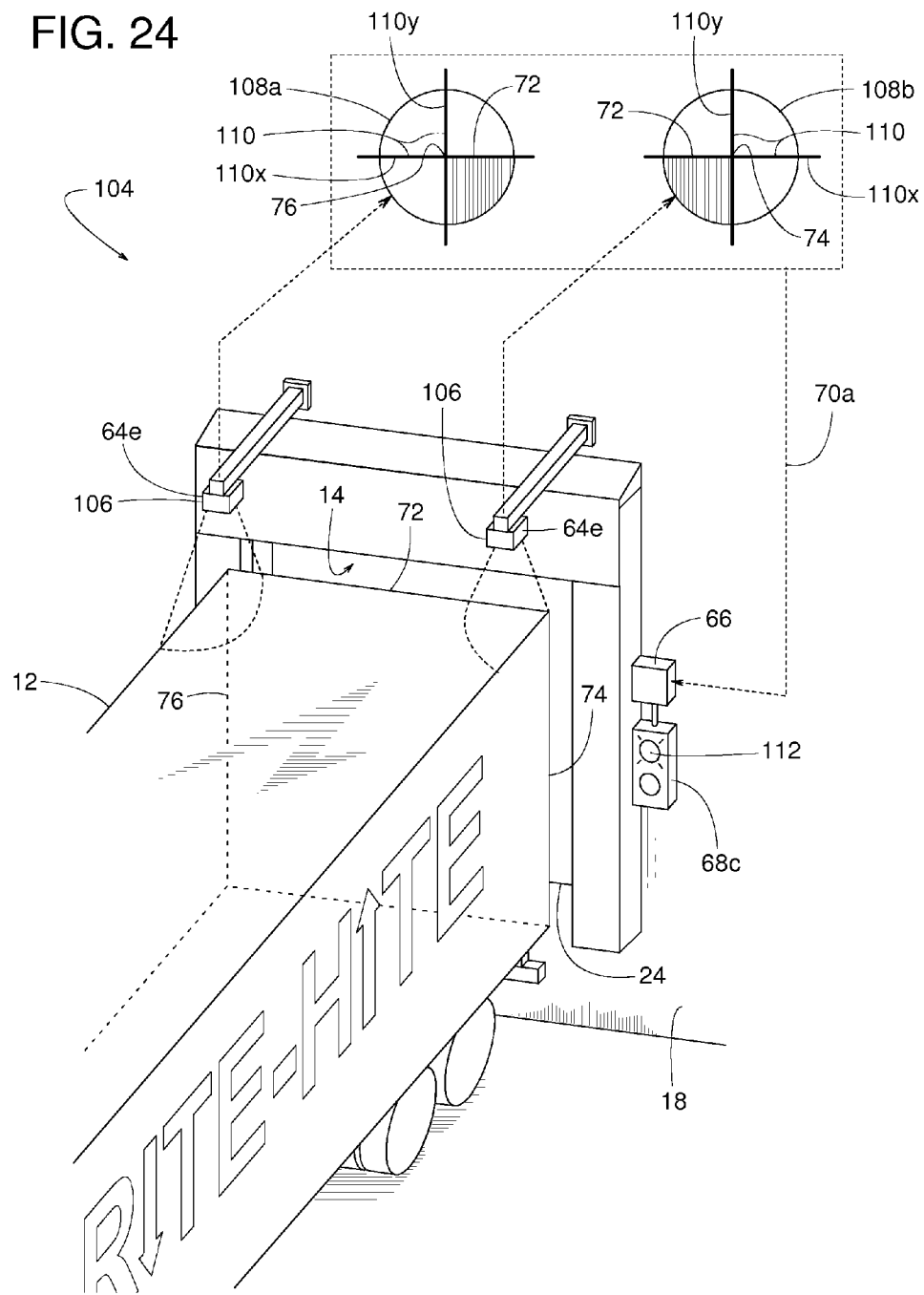

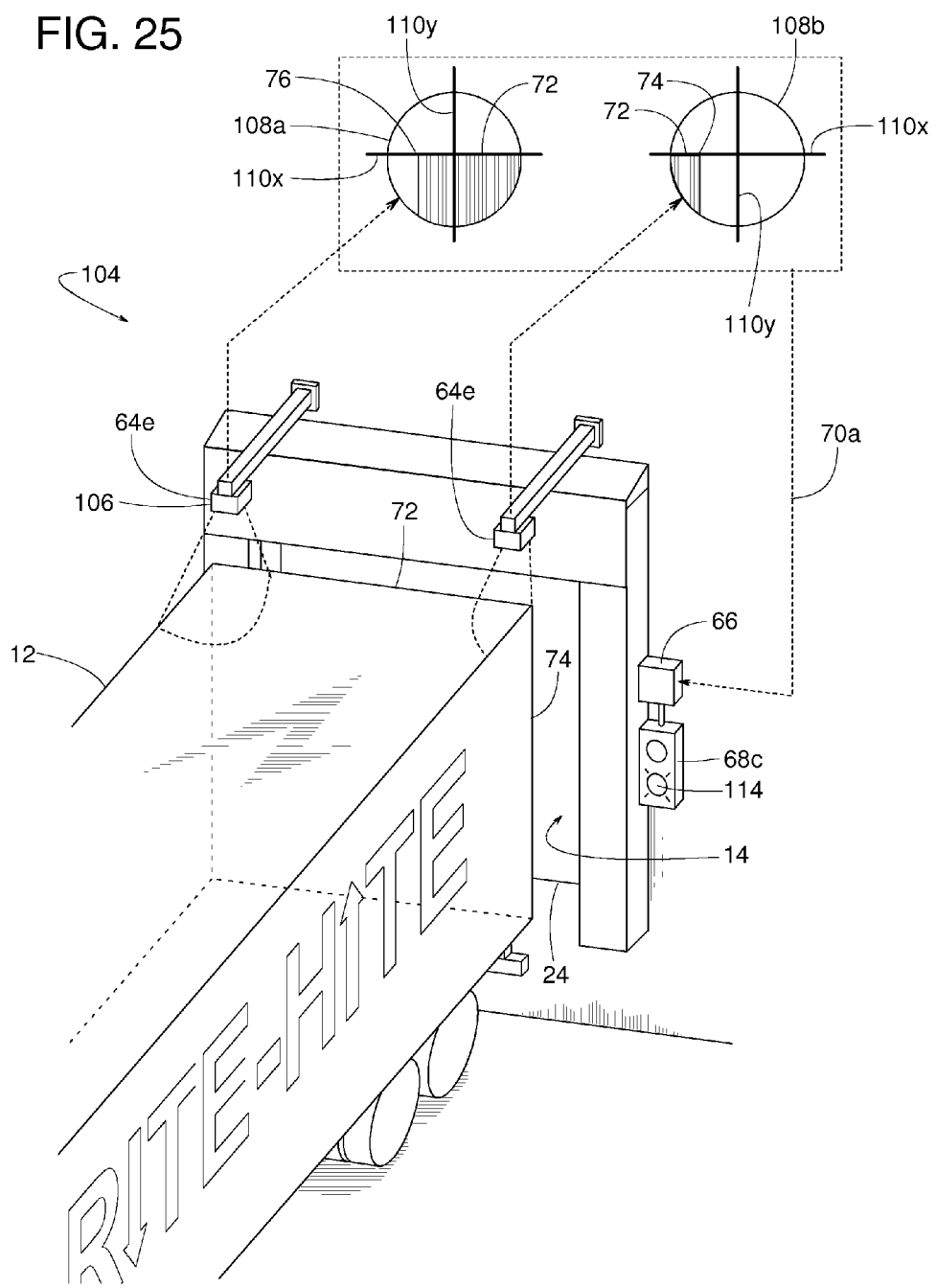

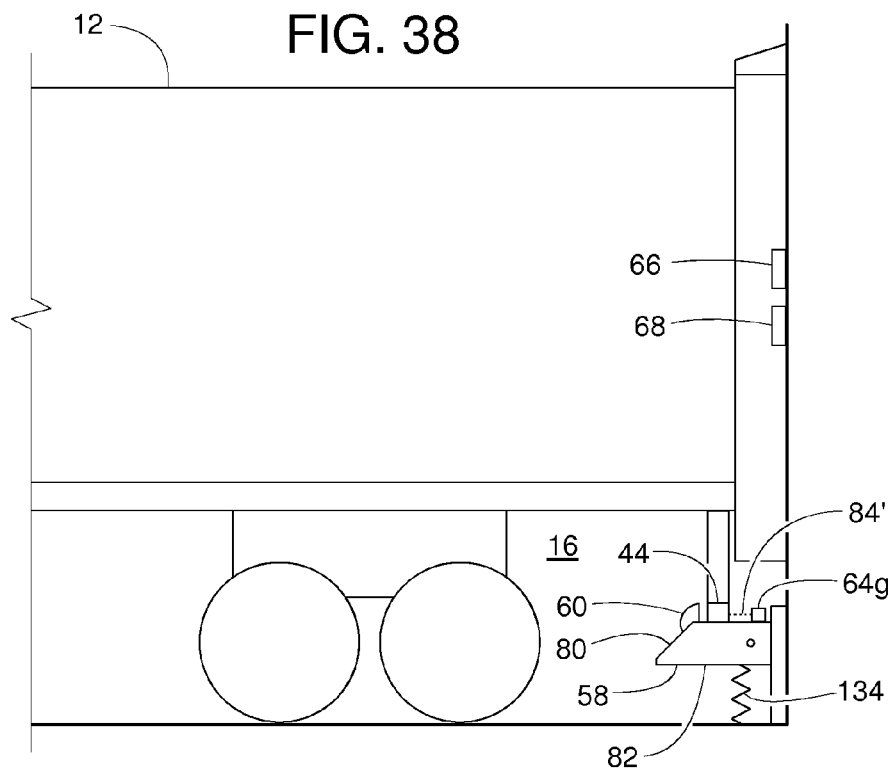
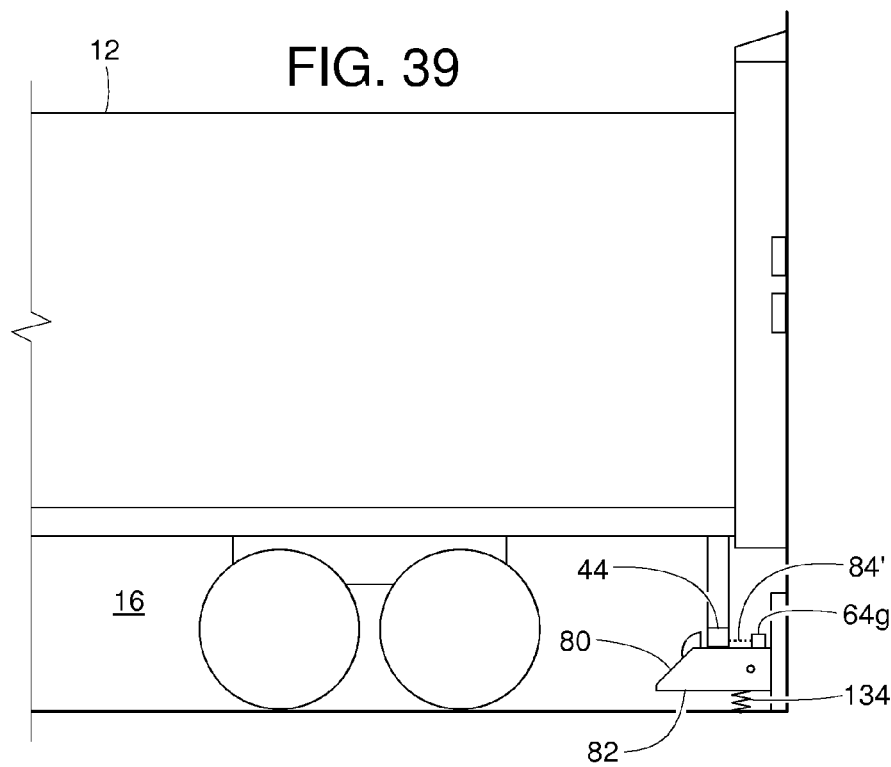

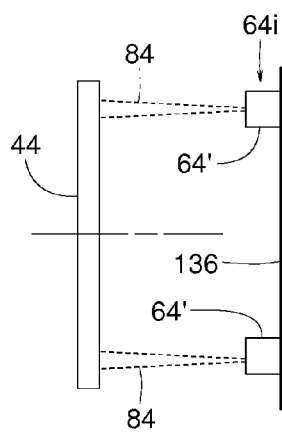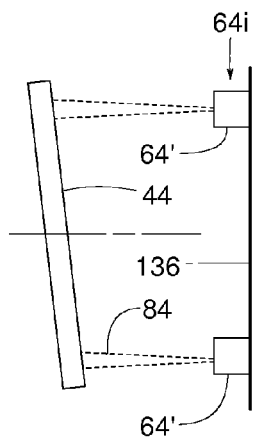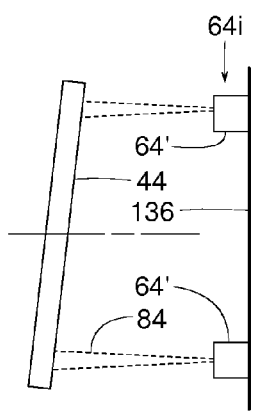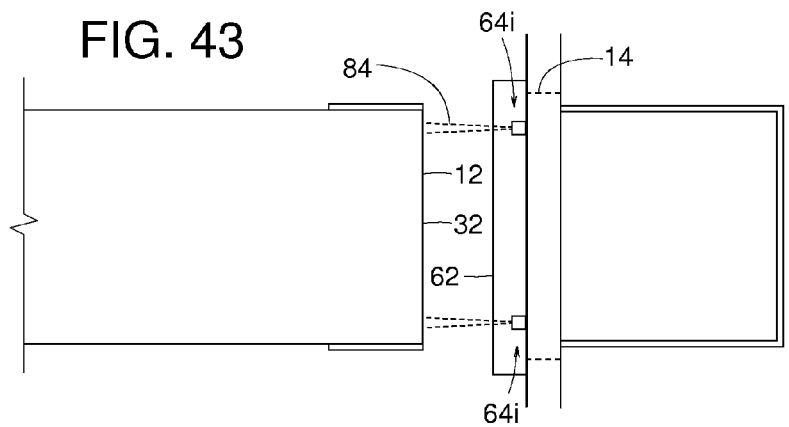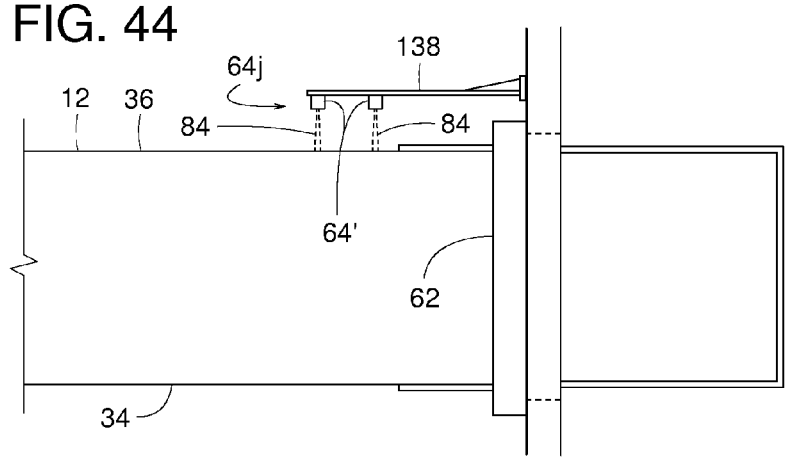

VEHICLE ALIGNMENT SYSTEMS FOR LOADING DOCKS

RELATED APPLICATION

This patent claims the benefit of U.S. Provisional Application Ser. No. 62/022,074, which was filed on Jul. 8, 2014, and which is hereby incorporated herein by reference in its entirety.

FIELD OF THE DISCLOSURE

The present disclosure relates generally to vehicle loading docks and, more specifically, to vehicle alignment systems for loading docks.

BACKGROUND

Typical loading docks provide an area for trucks to back up to an elevated platform of a building so that cargo can be exchanged with the truck and/or its trailer. The cargo is transferred though a dock doorway of the building and a rear access door of the truck. To facilitate or improve the loading and/or unloading operations, some loading docks include equipment such as weather barriers, dock levelers and/or vehicle restraints.

Weather barriers, such as dock seals and dock shelters, are installed on the exterior of the building along the perimeter of the dock doorway. During loading and unloading of cargo, weather barriers seal or shelter a gap that would otherwise exist between the rear of the truck and the dock face of the building. By sealing or sheltering this area, weather barriers reduce (e.g., minimize) exchange of air and/or contaminants between the outdoor environment and the interiors of the truck and the building. Specific examples of dock shelters and dock seals are disclosed in U.S. Pat. Nos. 6,205,721; 6,233,885; 7,185,463 and 8,307,588, which are incorporated herein by reference.

Dock levelers typically comprise a pivotal or otherwise vertically adjustable deck with a retractable lip extension. The deck and lip provide an adjustable bridge between the truck and the building's elevated platform. The adjustable bridge serves as a path across which material handling equipment can travel as the equipment carries cargo to and from the truck. Examples of such material handling equipment include forklifts, pallet trucks, and automatic guided vehicles (e.g., laser guided vehicles). Examples of dock levelers are disclosed in U.S. Pat. Nos. 5,440,772; 6,311,352; and 7,213,285, which are incorporated herein by reference.

Vehicle restraints help secure a truck at the dock during loading and/or unloading operations. Vehicle restraints are often installed on the exterior of the building, beneath the doorway. Vehicle restraints usually have a moveable barrier to selectively block and release the vehicle's RIG (rear impact guard or sometimes known as an ICC bar). Some vehicle restraints also include means for supporting the underside of the RIG to impede downward movement of the trailer bed of the truck as the weight of cargo and material handling equipment is added to the truck. Some example vehicle restraints are disclosed in U.S. Pat. Nos. 8,678,736 and 8,616,826, both of which are incorporated herein by reference.

BRIEF DESCRIPTION OF THE DRAWINGS

FIG. 7 is a rear view of the vehicle shown in FIGS. 1-6.

FIG. 8 is a partial side view of an example vehicle parked at a dock having another example vehicle alignment system constructed in accordance with the teachings disclosed herein.

FIG. 9 is a schematic diagram of the example vehicle alignment system of FIG. 8 with a schematic end view showing a silhouette of a vehicle with reference to an outline of a building doorway.

FIG. 10 is a schematic diagram similar to FIG. 9 but showing the vehicle in an offset position.

FIG. 11 is a schematic diagram similar to FIG. 10 but showing the vehicle in another offset position.

FIG. 12 is a schematic diagram similar to FIG. 10 but showing the vehicle in another offset position.

FIG. 13 is a schematic diagram similar to FIG. 10 but showing the vehicle in yet another offset position.

FIG. 14 is a schematic diagram similar to FIG. 9 but showing an example vehicle that is narrower than the example vehicle of FIGS. 9-13.

FIG. 15 is a schematic diagram similar to FIG. 14 but showing the vehicle in an offset position.

FIG. 16 is a schematic diagram similar to FIG. 15 but showing the vehicle in another offset position.

FIG. 17 is a schematic diagram similar to FIG. 15 but showing the vehicle in yet another offset position.

FIG. 18 is a schematic diagram similar to FIG. 15 but showing the vehicle in yet another offset position.

FIG. 19 is a schematic diagram similar to FIG. 14 but showing another example vehicle alignment system constructed in accordance with the teachings disclosed herein.

FIG. 22 is a partial top view similar to FIG. 20 but showing another example vehicle alignment system constructed in accordance with the teachings disclosed herein.

FIG. 23 is a partial top view similar to FIG. 22 but showing the vehicle laterally off center relative to a doorway of a building.

FIG. 24 is a perspective view of another example vehicle alignment system constructed in accordance with the teachings disclosed herein.

FIG. 25 is a perspective view similar to FIG. 24 but showing the vehicle laterally off center relative to a doorway of a building.

FIG. 38 is a partial side view of the vehicle alignment system shown in FIG. 37 but showing an example vehicle's RIG restrained by an example vehicle restraint.

FIG. 39 is a partial side view similar to FIG. 38 but the example RIG at a lower elevation.

FIG. 40 is a schematic top view similar to FIG. 34 but showing another example vehicle alignment system constructed in accordance with the teachings disclosed herein.

FIG. 41 is a schematic top view similar to FIG. 40 but showing an example vehicle's RIG at an angularly misaligned orientation.

FIG. 42 is a schematic top view similar to FIG. 41 but showing the example vehicle's RIG at another angularly misaligned orientation.

FIG. 43 is a partial top view similar to FIG. 20 but showing another example vehicle alignment system constructed in accordance with the teachings disclosed herein.

FIG. 44 is a partial top view similar to FIG. 20 but showing another example vehicle alignment system constructed in accordance with the teachings disclosed herein.

DETAILED DESCRIPTION

Figure 1:
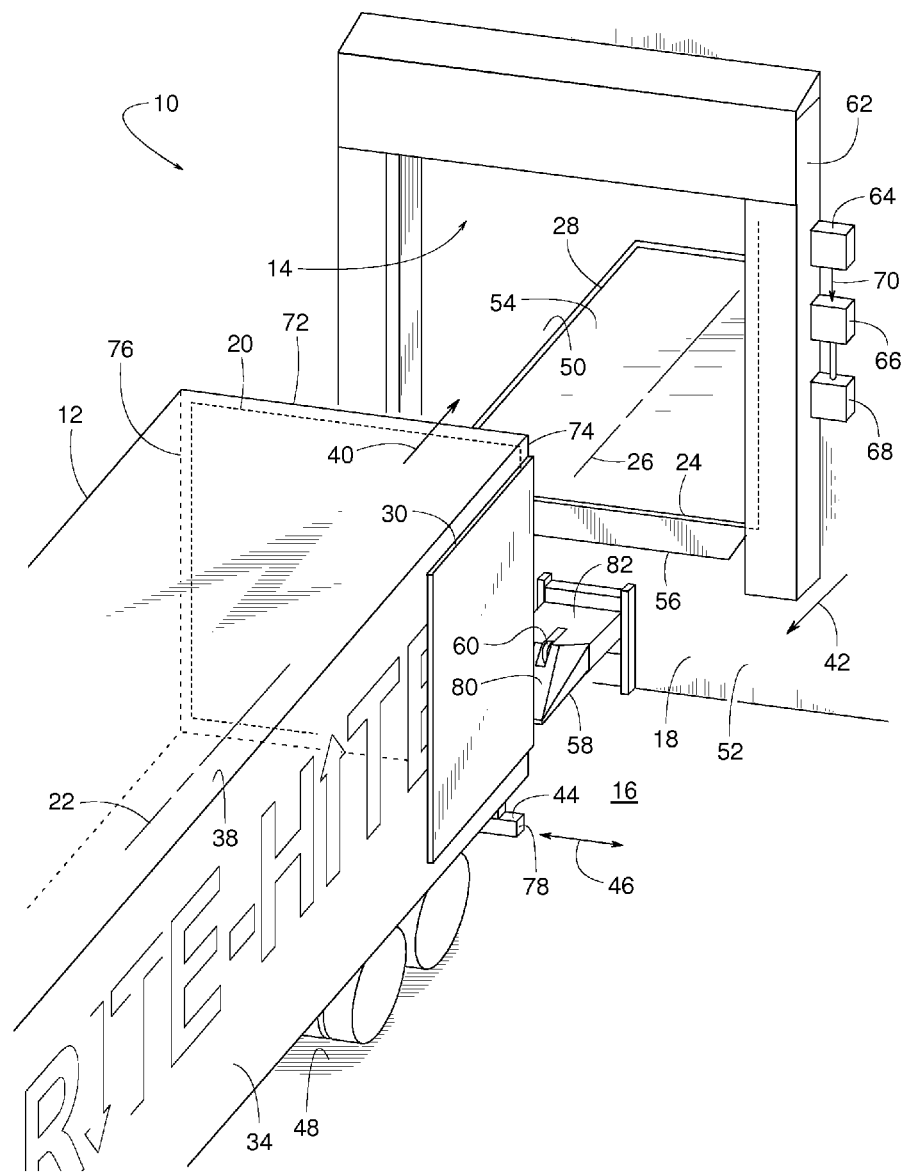
FIG. 1 is a perspective view of an example vehicle alignment system constructed in accordance with the teachings disclosed herein.

Example vehicle alignment methods, systems, apparatus and/or articles of manufacture for use at loading docks are disclosed herein. Example vehicle alignment systems disclosed herein monitor, align and/or guide a vehicle that is parked at or approaching a loading dock. Some example vehicle alignment systems disclosed herein include one or more example sensor systems that monitor spatial characteristics of a vehicle (e.g., surfaces of interest of a vehicle), such as an orientation (e.g., of a RIG) of a vehicle as the vehicle moves or backs into a loading dock and/or as the vehicle is being loaded and/or unloaded of cargo. The example monitored orientation may be with respect to any spatial characteristic such as, for example, the vehicle's angular position, lateral position and/or distance away from a reference point such as, for example, a doorway of the loading dock. In some examples, a display may provide a visual indication of the vehicle's alignment to help guide a driver of the vehicle to properly dock the vehicle. Some example sensor systems disclosed herein monitor the orientation of the vehicle's standardized RIG (rear impact guard). In some examples, an example sensor system disclosed herein moves vertically to follow corresponding vertical movement of the RIG. In some examples, an example sensor system disclosed herein may be mounted to a vertically movable portion of a vehicle restraint.

FIGS. 1-6 show an example vehicle alignment system 10 to help determine or confirm that a vehicle 12 is aligned with a doorway 14 of a loading dock 16. An alignment as disclosed herein, for example, pertains to the vehicle's angular alignment, lateral alignment and/or distance from a dock face 18 and/or any other target reference of the dock 16. For example, angular alignment is a measure of the perpendicularity between the vehicle's longitudinal centerline 22 and a front edge 24 of (e.g., below) the dock doorway 14. In some examples, a lateral alignment is a measure of the placement, position and/or orientation (e.g., horizontally centered) of the vehicle's longitudinal centerline 22 relative to a reference (e.g., the dock doorway 14, a longitudinal centerline 26 of a dock leveler 28). In some examples, a lateral alignment is a measure of how close the vehicle's longitudinal centerline 22 is (e.g., horizontally centered) relative to a reference (e.g., a longitudinal centerline 26 of a dock leveler 28).

The term, "vehicle" may include any wheeled apparatus with a cargo bay for transporting cargo. Examples of the vehicle 12 include, but are not limited to, a truck, an enclosed trailer, a van, and/or an open trailer. In some examples, the vehicle 12 has a vehicle doorway 20 with one or more doors 30 for providing access to a vehicle's cargo bay. Some examples of the one or more doors 30 swing open, as shown in FIG. 1. Other examples of the one or more doors 30 translate between open and closed positions, such as a rollup door or segmented articulated door (e.g., similar to a conventional garage door).

Additional features of the vehicle 12 include a rear surface 32 (FIGS. 3 and 7), a first lateral side 34, a second lateral side 36 (FIG. 7) and a roof 38. In some examples, the lateral sides 34 and 36 include swung-open door panels. The rear surface 32 is any surface of the vehicle 12 that faces generally in the vehicle's rearward travel direction 40 as the vehicle 12 backs into the dock 16. For example, the rear surface 32 is generally orientated toward the dock face 18 when the vehicle 12 backs into the dock 16. The vehicle's rearward travel direction 40 is generally opposite to a forward direction 42 in which dock face 18 faces.

Some examples of the vehicle 12 include a RIG 44 (e.g., a rear impact guard, also known as an ICC bar). A RIG or ICC bar is a structural beam that is elongate in a lateral direction 46 and extends horizontally across the rear of the vehicle 12, below the vehicle's doorway 20. The RIG 44 helps prevent an automobile or another vehicle from underriding the vehicle 12 in a rear-end collision.

The term, "loading dock" or "dock" refers to any area comprising a driveway 48 leading to the doorway 14 through which cargo passes between the vehicle 12 and a platform 50 of a building 52. The platform 50 is elevated relative to the driveway 48 even though the platform 50, in some examples, is the floor of the building 52. To facilitate the transfer of cargo, some examples of the loading dock 16 include the dock leveler 28. In some examples, the dock leveler 28 includes a pivotal and/or otherwise vertically adjustable deck 54 with an extendible lip 56, where the deck 54 and the lip 56 provide an adjustable bridge between the vehicle 12 and the platform 50.

Some examples of the loading dock 16 include a vehicle restraint 58 to help ensure that the vehicle 12 is properly parked and secured at the dock 16 during loading and/or unloading operations. The vehicle restraint 58 shown in FIGS. 1-6 is schematically illustrated to represent a device having a movable barrier 60 to selectively block and release the vehicle's RIG 44. Some examples of the vehicle restraint 58 also include a structure, a support, a brace, and/or other means for supporting the underside of the RIG 44 to impede or restrict downward movement of the vehicle's truck or trailer bed as the weight of cargo and/or material handling equipment is added to the vehicle 12. Some examples of the vehicle restraint 58 are disclosed in U.S. Pat. Nos. 8,678,736 and 8,616,826, which are incorporated herein by reference. Although the vehicle alignment system 10 can be used with any type of vehicle restraint, some examples of system 10 disclosed herein work particularly well with vehicle restraints that have an upwardly biased stored position, where rearward travel of the vehicle 12 along a (e.g., a ramp) portion of the vehicle restrain forcibly lowers the restraint to an operative RIG-blocking position.

Additionally or alternatively, some examples of the loading dock 16 include a weather bather 62 that, during loading and/or unloading operations, reduces (e.g., minimizes) the exchange of air (e.g., and any contaminants and/or precipitation in the air) between the outdoor environment and the interiors of the vehicle 12 and/or the building 52. The weather barrier 62 is schematically illustrated to represent different types of weather barriers including, but not limited to, dock shelters and/or dock seals. Some example dock shelters and/or dock seals are disclosed, for example, in U.S. Pat. Nos. 6,205,721; 6,233,885; 7,185,463 and 8,307,588, which are incorporated herein by reference.

In the example illustrated in FIGS. 1-6, the vehicle alignment system 10 comprises a sensor system 64 (e.g., example sensor systems 64*a-j* shown in FIGS. 7-44 and disclosed below), a controller 66, and a display 68 (e.g., example displays 68*a-e* shown in FIGS. 7-44 and disclosed below). The sensor system 64 is schematically illustrated to represent any device and/or a collection of devices that generates a feedback signal 70 in response to detecting a feature (e.g., a spatial parameter, a RIG, a surface such as an upper corner of a trailer, an edge or midpoint of a bay opening, etc.) of the vehicle 12, where the detected feature provides an indication of at least some part of the vehicle's orientation, condition and/or position (e.g., the vehicle's alignment relative to a reference point). Examples of the sensor system 64 include, but are not limited to, a sensor system 64*a* of FIGS. 8-18, a sensor system 64*b* of FIG. 19, a sensor system 64*c* of FIGS. 20 and 21, a sensor system 64*d* of FIGS. 22 and 23, a sensor system 64*e* of FIGS. 24-26, a sensor system 64*f* of FIG. 29, a sensor system 64*g* of FIGS. 30-33 and 37-39, a sensor system 64*h* of FIGS. 34-36, a sensor system 64*i* of FIGS. 40-43, and/or a sensor system 64*j* of FIG. 44. Examples of the sensor system 64 operate under various principles, examples of which include, but are not limited to, active infrared, passive infrared, ultrasonic, radar, microwave, laser, electromagnetic induction, pressure (e.g., pressure pad), electomechanics (e.g., a limit switch), ultra-IR LED, time-of-flight pulse ranging technology, photoelectric (e.g., photoelectric eye), video analytics, photo analytics, and/or various combinations thereof. Example formats of the feedback signal 70 include, but are not limited to, a binary value (e.g., on/off), a digital value, an analog value, an image (e.g., an image file), a video (e.g., a video file), and/or various combinations and pluralities thereof.

Some example features of the vehicle 12 detected by the sensor system 64 include, but are not limited to, an edge of a body (e.g., a trailer), a surface, the absence of a surface, an outline of a structure (e.g., a perimeter of the cargo bay opening), an image of a body (e.g., an image of a trailer), etc. In some examples, the part or parts of the vehicle 12 that are monitored, detected and/or sensed by the sensor system 64 can vary. Examples of such parts include, but are not limited to, the vehicle's rear surface 32 (e.g., including but not limited to a rear surface of the RIG 44), the vehicle's first lateral side 34, the second lateral side 36, the roof 38, an upper rear edge 72 of the vehicle 12, a first rear edge 74 of the vehicle 12, a second rear edge 76 of the vehicle 12, a door panel, the RIG 44, lateral edges 78 of the RIG 44, upper and/or lower edges of the RIG 44, and/or any other surface and/or edge of the vehicle 12, etc.

Examples of the vehicle's orientation include, but are not limited to, the perpendicularity of the vehicle's longitudinal centerline 22 relative to the front edge 24 (e.g., of the doorway 14 and/or the dock face 18), a proximity (e.g., alignment of) the vehicle's longitudinal centerline 22 (e.g., horizontally centered) relative to the dock doorway 14, and/or a proximity (e.g., alignment of) the vehicle's longitudinal centerline 22 (e.g., horizontally centered) relative to the dock leveler's longitudinal centerline 26 and/or a longitudinal centerline of the vehicle restraint 58. Examples of the vehicle's condition include, but are not limited to, whether the vehicle 12 has a RIG, a size (e.g., a length or a width) of the RIG 44, and/or the straightness of the RIG 44. Examples of the vehicle's position include, but are not limited to, a distance between the RIG 44 and the dock face 18, a distance between the RIG 44 and the front edge 24, and/or the vehicle's distance from the doorway 14 and/or from the front edge 24.

The feedback signal 70 from the sensor system 64 is communicated to the controller 66 for interpretation and/or processing. The controller 66 as shown in FIGS. 1-6 is schematically illustrated to represent any circuitry (e.g., wiring, relays, IC circuit, computer, microprocessor, programmable logic controller, logic circuit and/or various combinations thereof) that receives and/or analyzes the feedback signal 70 to determine an alignment between, for example, the vehicle 12 and the dock doorway 14 and/or to command an operation of the display 68 based on feedback signal 70. The controller 66 can reside at any convenient location, and/or various parts of the controller 66 can be distributed over multiple locations. Example locations of the controller 66 include, but are not limited to, housed within a separate enclosure, housed within an enclosure that contains one or more parts of the display 68, housed within an enclosure that contains one or more parts of the sensor system 64, and/or various combinations thereof. In some examples, all or part of the sensor system 64 share a common enclosure with all or part of the display 68.

The display 68 is schematically illustrated to represent any device (or plurality of devices) that provides a visual indication of the vehicle's alignment (e.g., angular alignment, lateral alignment, etc.), distance from the dock face 18 (or distance from an alternate reference), condition (e.g., a condition of the RIG 44), instructions, warnings and/or prompts. Examples of the display 68 include, but are not limited to, a display 68*a* of FIGS. 9-13, a display 68*b* of FIGS. 14-19, a display 68*c* of FIGS. 24, 25, 26 and 29, a display 68*d* of FIG. 27, a display 68*e* of FIG. 28, one or more lights, lights of different shapes, lights of different color, a text message, a symbol, an icon, a flashing light, virtual traveling lights, LED lights, a video monitor, and/or various combinations thereof, etc.

Figure 2:
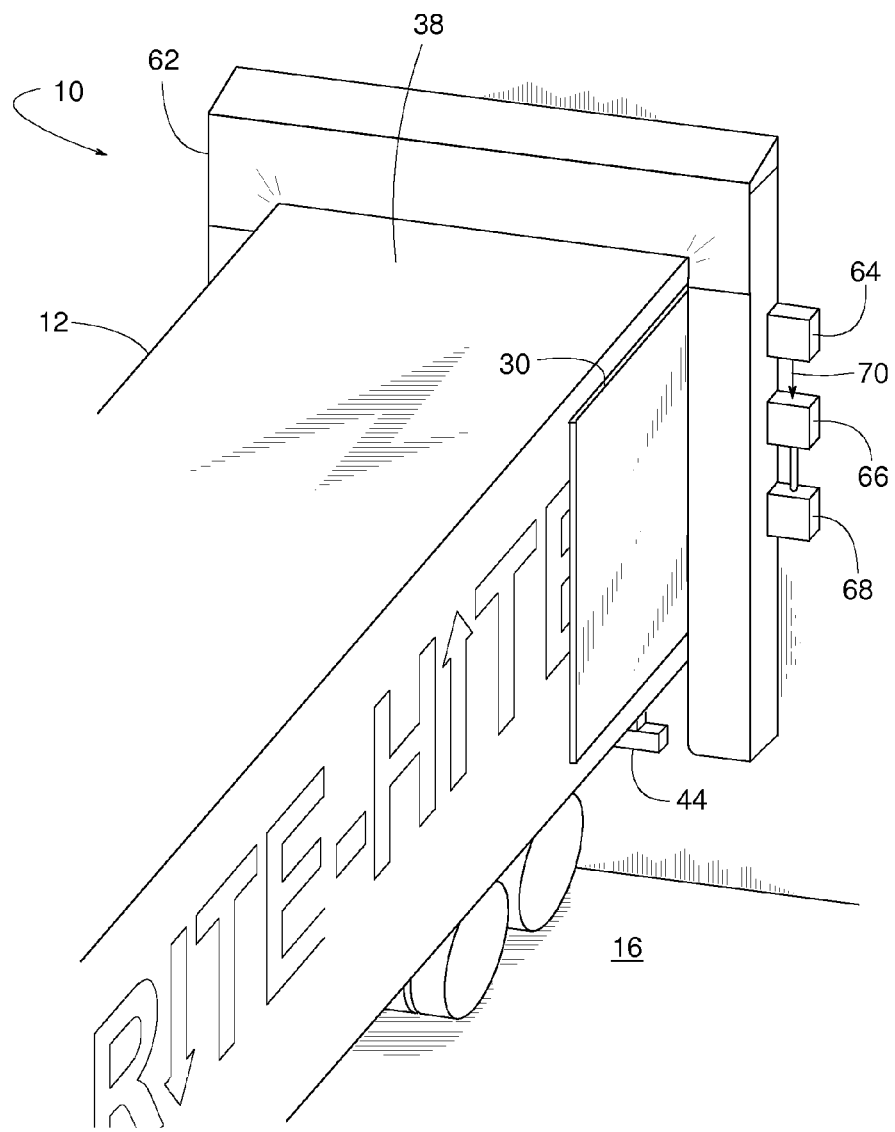
FIG. 2 is a perspective view similar to FIG. 1 but showing an example vehicle parked at a dock.
Figure 3:
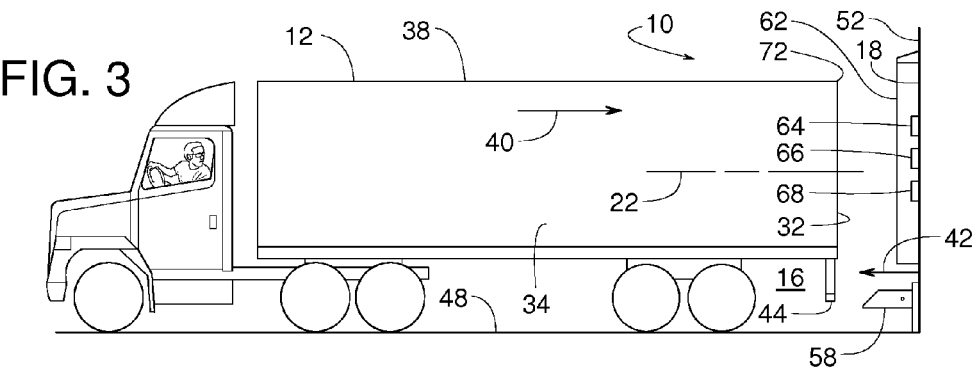
FIG. 3 is a side view of FIG. 1.
Figure 4:
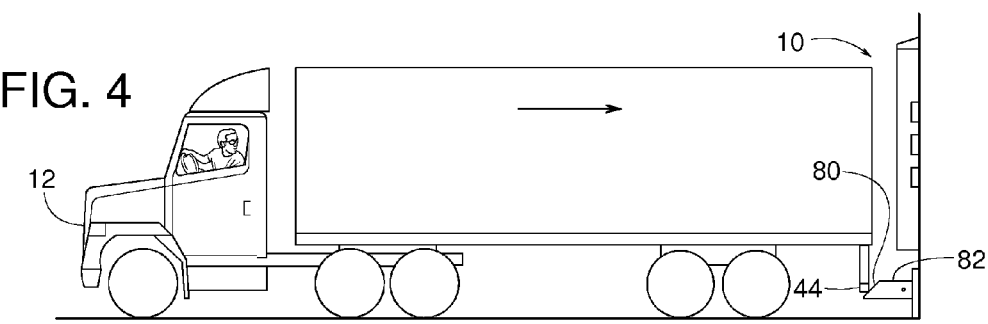
FIG. 4 is a side view similar to FIG. 3 but showing the vehicle having traveled farther back toward the dock.
Figure 5:
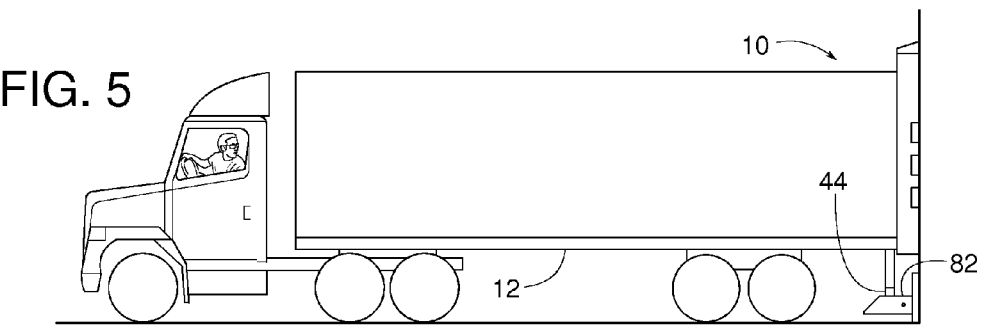
FIG. 5 is a side view similar to FIG. 4 but showing the vehicle having traveled even farther back toward the dock.
Figure 6:
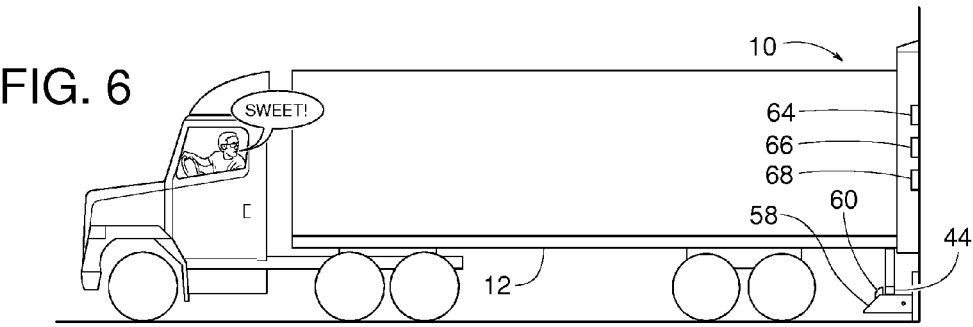
FIG. 6 is a side view of FIG. 2, but showing the vehicle restrained at the dock.

FIG. 1 shows the vehicle 12 backing into the dock 16 by traveling in rearward direction 40 toward the loading dock 16, and FIG. 2 shows the vehicle 12 (e.g., properly or sufficiently) docked at the loading dock 16. The docking sequence is illustrated in FIGS. 3-6, where FIG. 3 shows the vehicle 12 backing into the loading dock 16, and FIG. 4 shows the vehicle's RIG 44 engaging a lead-in edge 80 of the vehicle restraint 58. In some examples, as the vehicle 12 continues traveling back from the example position of FIG. 4 to the example position of FIG. 5, the RIG 44 slides along lead-in edge 80 to force a main body 82 of the vehicle restraint 58 down underneath the RIG 44, as shown in FIG. 5. Once the vehicle 12 is properly parked for loading and/or unloading operations, the barrier 60 of the vehicle restraint 58 rises in front of the RIG 44, as shown in FIG. 6, to restrain or secure the vehicle 12 at a docked position. The sensor system 64 monitors or senses the docking process, the controller 66 receives, analyzes or interprets the feedback signal 70 from the sensor system 64, and the display 68 communicates the status and/or results based on the feedback signal 70 to the vehicle's driver or other personnel in the area of the loading dock 16 and/or the dock doorway 14.

In the examples shown in FIGS. 8-18, the sensor system 64*a* includes a plurality of overhead sensors 64' that emit and/or receive a beam-like projection 84 (e.g., active infrared, passive infrared, ultrasonic, radar, microwave, laser, ultra-IR LED, time-of-flight pulse, photoelectric, video image, photo image, etc.) directed (e.g., generally vertically or downwardly) to detect the presence and/or an alignment (e.g., an offset absence) of the vehicle 12 relative to a reference (e.g., the dock doorway 14). In some examples, the projection 84 is referred to as a field of view. In the example of FIGS. 8-18, four sensors 64' are utilized, where the two (e.g., laterally) outer sensors 64' (e.g., outer sensor pair) detect the lateral alignment of generally wider examples of the vehicle 12, as shown in FIGS. 9-13, and the two more (e.g., centrally located) inner sensors 64' (e.g., inner sensor pair) detect the lateral alignment of more narrow examples of the vehicle 12, as shown in FIGS. 14-18.

FIG. 9 shows the two outer sensors 64' being uninterrupted (e.g., non-activated, non-triggered) by the vehicle 12 while the two inner sensors 64' are interrupted (e.g., activated, triggered) by the vehicle's roof 38. This feedback provided by the outer sensors 64' and the inner sensors 64' can indicate that the vehicle 12 (e.g., a longitudinal centerline of the vehicle 12) is aligned (e.g., substantially aligned, laterally centered, etc.) relative to a reference such as, for example, the dock doorway 14. The interrupted/uninterrupted states of sensors 64' are communicated to the controller 66, which interprets the feedback and controls the display 68*a* accordingly. In the case of FIG. 9, the controller 66 commands the display 68*a* to emit and/or otherwise generate a (e.g., central) light 86 indicating proper, sufficient or satisfactory (e.g., lateral) alignment of the vehicle 12 (e.g., a longitudinal axis and/or other surface of the vehicle 12) relative to the dock doorway 14.

FIG. 10 shows the vehicle 12 (e.g., a longitudinal axis and/or other surface of the vehicle 12) shifted or offset slightly (e.g., offset slightly to the left within an acceptable threshold) relative to a reference (e.g., the dock doorway 14). As shown in the example of FIG. 10, the two outer sensors 64' are uninterrupted by the vehicle 12 while the two inner sensors 64' are interrupted. In this example case, the generally wider the vehicle 12 is within an allowable tolerance (e.g., a lateral distance of being laterally centered) relative to the dock doorway 14. The interrupted/uninterrupted states of the sensors 64' are communicated to the controller 66, which interprets the feedback and commands the display 68*a* to emit the (e.g., central) light 86 indicating the vehicle 12 is within an acceptable tolerance of proper lateral alignment relative to, for example, the dock doorway 14.

FIG. 11 shows the vehicle 12 shifted or offset (e.g., offset so far to the left outside an acceptable threshold) that one of the outer sensors 64' (e.g., the far left outer sensor 64' in the orientation of FIG. 11) is interrupted by the vehicle 12. Regardless of the states of the other three sensors 64', the controller 66 interprets the interruption of the triggered (e.g., the far left) outer sensor 64' to indicate that the vehicle 12 is shifted outside an alignment threshold (e.g., too far to the left as shown in FIG. 11) relative to, for example, a reference (e.g., a centerline of the doorway 14 or the restraint 18). Consequently, the controller 66 commands the display 68*a* to emit a signal indicative of the vehicle 12 being unaligned (e.g., offset too far) relative to a reference (e.g., a centerline of the doorway 14 or the restraint 18). In the illustrated example of FIG. 11, the display 68*a* emits, for example, a left arrow light 88.

FIG. 12 is similar to FIG. 10 but with the vehicle 12 shifted or offset slightly to the right instead of the left in the orientation of FIG. 12 within an acceptable alignment tolerance relative to a reference (e.g., the dock doorway 14). The two outer sensors 64' as shown in FIG. 12 are uninterrupted by the vehicle 12 while the two inner sensors 64' are interrupted. In this case, the generally wider the vehicle 12 is within the allowable alignment tolerance (e.g., laterally centered) relative to a reference (e.g., a dock doorway 14). The interrupted/uninterrupted states of sensors 64' are communicated to the controller 66. In response to the feedback from the sensors 64', the controller 66 commands the display 68*a* to emit the (e.g., central) light 86 to indicate that the vehicle 12 is within the acceptable tolerance or alignment (e.g., a lateral alignment) relative to the reference (e.g., the doorway 14).

FIG. 13 shows vehicle 12 shifted or offset (e.g., offset so far to the right in the orientation of FIG. 13) outside of the alignment tolerance such that the (e.g., far right) outer sensor 64' in the orientation of FIG. 13 is interrupted by the vehicle 12. Regardless of the states of the other three sensors 64', the controller 66 interprets or determines the interruption of the triggered (e.g., far right) outer sensor 64' to indicate that the vehicle 12 (e.g., a longitudinal axis or centerline of the vehicle 12) is outside the alignment tolerance or threshold (e.g., shifted too far to the right in the orientation of FIG. 12) relative to the reference (e.g., the dock doorway 14). Consequently, the controller 66 commands the display 68*a* to emit a signal indicative of the vehicle 12 being outside the alignment threshold (e.g., unaligned or offset too far) relative to a reference (e.g., the dock doorway 14, a centerline of the dock doorway 14 and/or the vehicle restraint 18). In the illustrated example of FIG. 13, the display 68a emits a right arrow light 90.

FIGS. 14-18 are similar to and correspond to FIGS. 9-13, respectively. In the example of FIGS. 14-18, the vehicle 12 (e.g., a trailer or body of the vehicle 12) is narrower than (e.g., a trailer or body of) the example vehicle 12 in FIGS. 9-13. The example system 10 of FIGS. 14-18 includes the display 68b having a series of lights 92 (e.g., series of LEDs) that are controlled to indicate various alignment conditions of the vehicle 12 relative to a reference such as, for example, the dock doorway 14.

FIG. 14 shows the two outer sensors 64' being uninterrupted by the vehicle 12 while the two inner sensors 64' are interrupted by the vehicle's roof 38. Such an interruption/uninterrupted pattern indicates that the vehicle 12 is aligned (e.g., laterally centered) relative to the reference and/or the dock doorway 14. The interrupted/uninterrupted states of the sensors 64' are communicated to the controller 66, which interprets or analyzes the feedback and controls the display 68b. In the example case of FIG. 14, the controller 66 commands the display 68b to steadily energize all of the lights 92, thereby indicating proper lateral alignment of the vehicle 12 relative to a reference (e.g., the dock doorway 14).

FIG. 15 shows the vehicle 12 shifted or offset slightly (e.g., to the left in the orientation of FIG. 15) relative to a reference (e.g., the dock doorway 14). In the illustrated example of FIG. 15, the two outer sensors 64' are uninterrupted by the vehicle 12 while the two inner sensors 64' are interrupted. In this case, the vehicle 12 is still within an allowable tolerance of being aligned (e.g., laterally centered) relative to the reference (e.g., dock doorway 14). The interrupted/uninterrupted states of the sensors 64' are communicated to the controller 66, which interprets the feedback and commands the display 68b to steadily energize all of the lights 92, thereby indicating the vehicle 12 is within an acceptable tolerance of being aligned (e.g., proper lateral alignment) relative to the reference.

FIG. 16 shows vehicle 12 shifted or offset (e.g., so far to the left in the orientation of FIG. 16) outside an alignment threshold such that one of the (e.g., right) inner sensors 64' is uninterrupted by the vehicle 12. Regardless of the states of the other three sensors 64', the controller 66 interprets or determines the uninterrupted state of the (e.g., right) inner sensor 64' as a result that the vehicle 12 is not aligned (e.g., shifted too far to the left) relative to the reference. Consequently, the controller 66 commands the display 68b to emit a signal indicative of a misalignment between the vehicle 12 and the reference (e.g., an alignment outside the alignment threshold). In the illustrated example, the display 68b energizes the lights 92 in a sequential pattern that provides a visual illusion of a movement 94 (e.g., a series of lights providing a "visual illusion of movement"). In some examples, the lights 94 appear to move to in a first direction (e.g., to the right) to indicate the direction the vehicle 12 should shift or move (e.g., laterally) to improve the vehicle's (e.g., lateral) alignment relative to the reference (e.g., within the acceptable alignment tolerance). In some examples, the lights 94 appear to move in a second direction (e.g., to the left) to indicate the direction the vehicle 12 is laterally offset relative to the reference (e.g., the doorway 14). In some examples, the lights 92 illuminate an arrow-like pattern.

FIG. 17 is similar to FIG. 15 but with the vehicle 12 shifted or offset slightly (e.g., to the right instead of the left) relative to the reference. The two outer sensors 64' are uninterrupted by the vehicle 12 while the two inner sensors 64' are interrupted. In this case, the narrower vehicle 12 is within the allowable alignment tolerance aligned (e.g., laterally centered) relative to the doorway 14. The interrupted/uninterrupted states of the sensors 64' are communicated to the controller 66, which responds by commanding the display 68b to steadily energize all of the lights 92, thereby indicating the vehicle 12 is within an acceptable tolerance of alignment (e.g., proper lateral alignment) relative to the reference.

FIG. 18 shows the vehicle 12 shifted or offset outside the alignment tolerance (e.g., so far to the right in the orientation of FIG. 18) such that the (e.g., left) inner sensor 64' is uninterrupted by the vehicle 12. Regardless of the states of the other three sensors 64', the controller 66 interprets the uninterrupted state of the (e.g., left) inner sensor 64' as evidence that the vehicle 12 is shifted too far to the right. Consequently, the controller 66 commands the display 68b to energize the lights 92 in a sequential pattern that provides a visual illusion of a movement 96. In some examples, the lights 92 appear to move to the left to indicate the direction the vehicle 12 should shift in order to improve the vehicle's lateral alignment. In some examples, the lights 92 appear to move to the right to indicate the direction the vehicle 12 is laterally offset relative to the doorway 14. In some examples, the lights 92 illuminate an arrow-like pattern.

In the example shown in FIG. 19, the example sensor system 64b includes two pluralities of overhead sensors 64' that each emit and/or receive a beam-like projection 84 directed (e.g., generally vertically and/or downwardly) to detect the presence or an alignment (e.g., an offset absence) of the vehicle 12 relative to a reference (e.g., the dock doorway 14). The controller 66 compares the feedback from the sensors 64' to determine whether the vehicle 12 is within an alignment threshold (e.g., laterally aligned). In some examples, the sensors 64' are separate discrete elements, in which each element is separated by a distance. In some examples, multiple sensors 64' are packaged in a single housing, whereby a single sensor assembly emits and/or receives a plurality of generally parallel projections 84.

Figure 20:
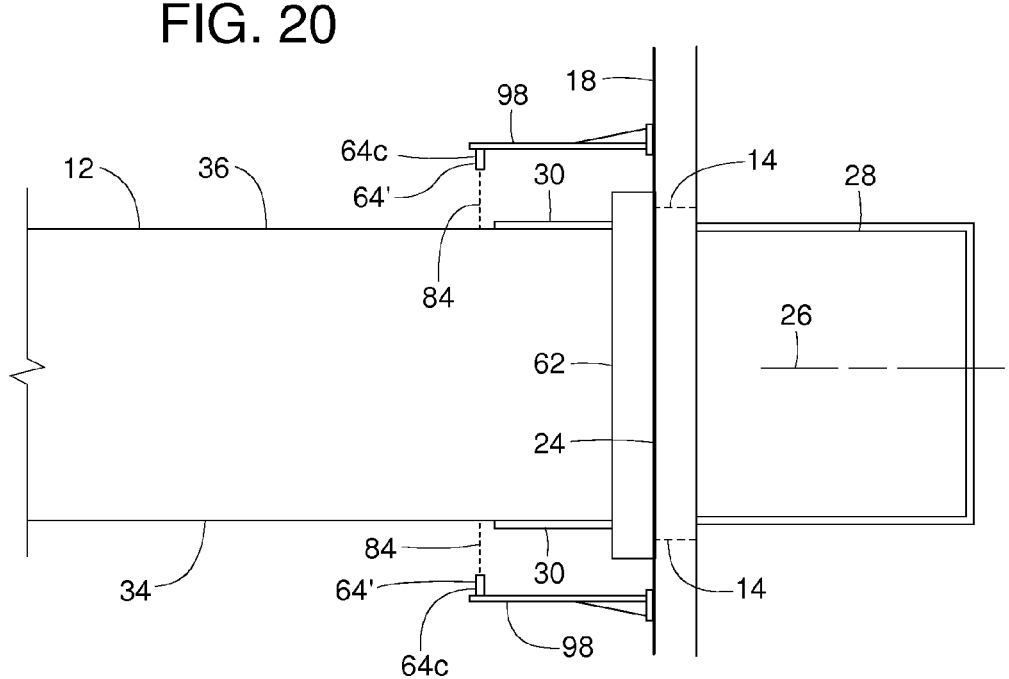
FIG. 20 is a partial top view of another example vehicle alignment system constructed in accordance with the teachings disclosed herein
Figure 21:
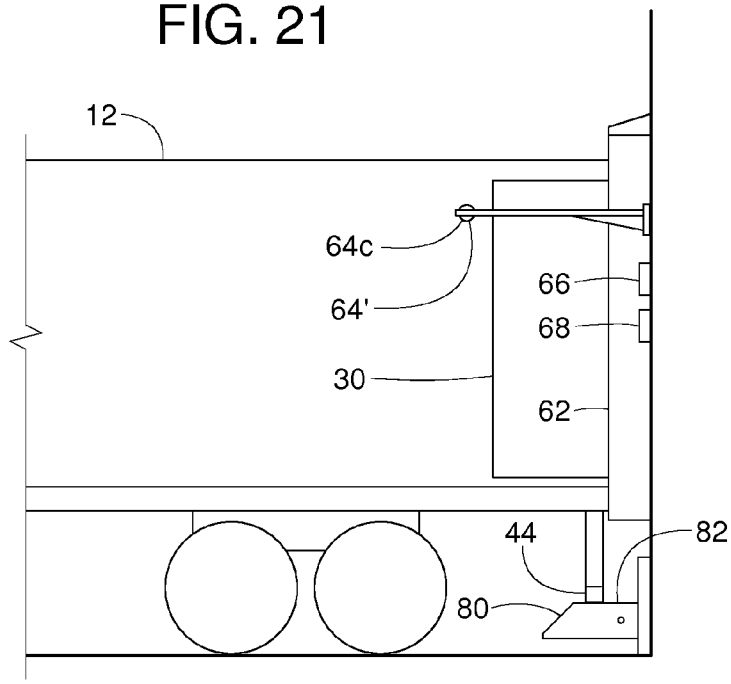
FIG. 21 is a side view of FIG. 20.

In the example shown in FIGS. 20 and 21, the sensor system 64c includes two sensors 64' that each emit and/or receive a beam-like projection 84 directed (e.g., generally horizontally, sideways and/or perpendicularly) relative to the vehicle's lateral sides (e.g., the first lateral side 34, the second lateral side 36, a side of a trailer, a side of a truck, a side of a swung-open door 30). In some examples, the sensors 64' are supported by brackets 98 that are attached to the dock face 18 or to some other structure of the building 52 and/or the dock 16. Each sensor 64' generates feedback that indicates or otherwise provides a distance from the associated lateral side (e.g., the first lateral side 34 or the second lateral side 36) of the vehicle 12. The controller 66 compares the feedback from the sensors 64' to one or more threshold values to determine whether the vehicle 12 is aligned (e.g., centered or laterally offset) within an alignment threshold, and commands the display 68 accordingly. For example, if a distance value provided by the first sensor 64' (e.g., the top sensor in the orientation of FIG. 20) is equal to or substantially equal to a distance value provided by the second sensor 64' (e.g., the bottom sensor), the controller 66 determines that the vehicle 12 is within the alignment threshold. In some examples, substantially equal distances include a difference between the first distance value and the second distance value that is approximately between 0.1 inches and 12 inches. In some examples, the controller 66 adjusts the display 68 to identify which of the first lateral side 34 or the second lateral side 36 satisfies or exceeds the one or more threshold values.

In a similar example, shown in FIGS. 22 and 23, the sensor system 64d comprises two sensors 100 each in the form of an electromechanical switch (e.g., a limit switch). Each sensor 100 includes and/or is associated with a mechanical actuator 102 (e.g., a lever, a paddle, pivotal plate, a trigger, a finger, a feeler, etc.) that triggers the sensor 100 to change state upon the actuator 102 engaging one of the vehicle's first lateral side 34 or second lateral side 36 and/or door panels. Each sensor 100 provides feedback indicating the sensor's state. The controller 66 interprets the feedback from the sensors 100 to determine whether the vehicle 12 is centered or is laterally offset outside the alignment threshold, and commands the display 68 accordingly. FIG. 22 shows the vehicle 12 laterally centered with neither sensors 100 being triggered and FIG. 23 shows one sensor 100 triggered due to the vehicle 12 being outside of the alignment threshold relative to a reference (e.g., too far laterally off center with respect to the second lateral side 36 while the first lateral side 34 untriggered.

Figure 26:
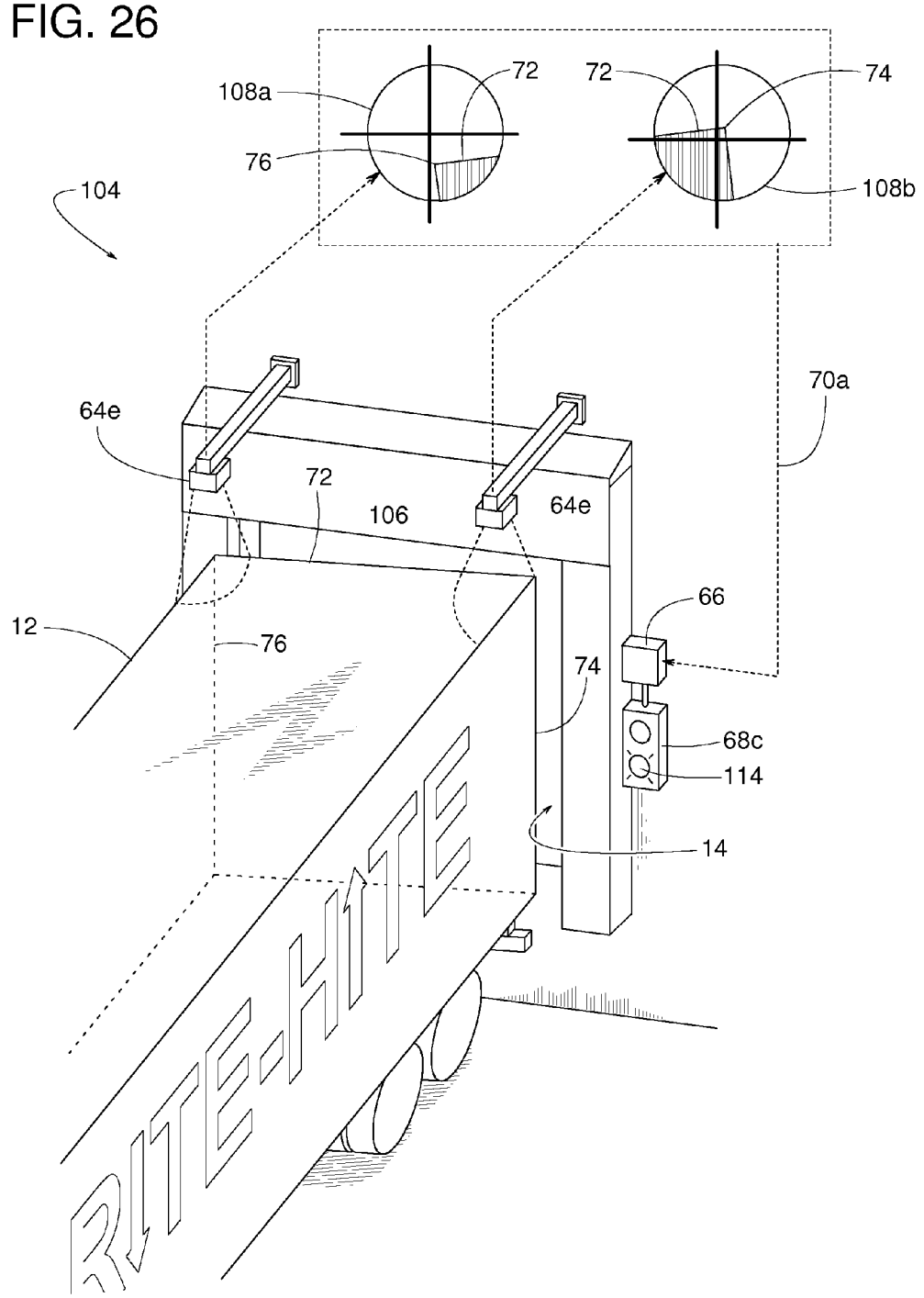
FIG. 26 is a perspective view similar to FIG. 24 but showing the vehicle misaligned angularly relative to a doorway of a building.

FIGS. 24, 25 and 26 show an example vehicle alignment system 104 that includes the sensor system 64e comprising one or more cameras 106 (e.g., a video camera and/or a still camera) aimed to capture at least one image of the vehicle 12. Upon capturing the at least one image, the sensor system 64e generates an image signal 70a (feedback) having one or more images (e.g., a first image 108a and a second image 108b). The controller 66 receives and/or interprets the image signal 70a to determine whether the vehicle 12 is within an alignment threshold (e.g., laterally centered (lateral position), angularly aligned (angular orientation), and/or sufficiently close to dock face 18 (front-to-back position)). The controller 66 compares the image signal 70a to a reference 110 (e.g., a reference Cartesian coordinate axis having any number of individual axes) to determine whether the image signal 70a deviates (e.g., laterally, angularly, and/or front-to-back) beyond one or more acceptable limits or threshold. In some examples, the reference 110 is a template image to be compared with one or more image signals 70a acquired by the one or more cameras 106.

Based on the comparison, the controller 66 commands the display 68c to indicate whether the vehicle's position or angular orientation (during approach or after docking) is acceptable or within one or more tolerance values (e.g., threshold values indicative of a distance, an angle or orientation, a number of pixels from one or more cameras 106, etc.). In the illustrated examples of FIGS. 24-26, the display 68c provides a first signal 112 or a second signal 114, wherein the first signal 112 indicates an acceptable approach or docked position, and the second signal 114 indicates an unacceptable approach or docked position. In some examples, the signals 112 and 114 are emitted from a single light source and are distinguishable by blinking frequency. In some examples, the blinking frequency varies in response to the vehicle's severity of misalignment relative to the reference. For example, the farther away a lateral distance from an acceptable tolerance threshold the misalignment, the greater the blinking frequency. In some examples, the signals 112 and 114 are emitted from separate light sources and are distinguishable by color. In some examples, the color of light varies in response to the vehicle's severity of misalignment.

Some example images are shown in FIGS. 24-26. In FIG. 24, images 108a and 108b show that the vehicle's rear edges 76 and 74 are aligned with both axes of reference 110 (the axes of reference 110 includes a horizontal axis 110x and a vertical axis 110y), thereby indicating that vehicle 12 is aligned relative to a reference (e.g., the dock doorway 14) within an acceptable threshold (e.g., properly centered and angularly aligned relative to the dock doorway 14 and/or the dock face 18). In FIG. 25, images 108a and 108b show that the vehicle's rear edges 76 and 74 are offset (e.g., to the left in the orientation of FIG. 25) relative to a vertical axis 110y, thereby indicating that the vehicle 12 is laterally offset (e.g., to the left outside of an acceptable alignment threshold). In FIG. 26, images 108a and 108b show that the vehicle's second rear edge 76 is farther back than the vehicle's first rear edge 74, thereby indicating that vehicle 12 is angularly misaligned relative to a reference (e.g., the x-axis 110x and/or the y-axis 110y).

Some examples of the display 68 (e.g., the displays 68a-e) provide one or more distinguishable visual signals that represent different alignment or position conditions so that the vehicle's driver can determine the type of misalignment relative to a reference, for instance, whether the vehicle 12 is only angularly misaligned, whether the vehicle 12 is only laterally misaligned, whether the vehicle 12 is misaligned both laterally and angularly, whether the vehicle 12 is offset laterally (e.g., to the right or to the left), whether the vehicle 12 is only slightly misaligned (e.g., within an alignment threshold), and whether the vehicle 12 is severely misaligned (e.g., outside of an alignment threshold). One or more determinations of slightly misaligned and/or severely misaligned may be determined by comparing one or more sensor system 64 values with one or more threshold values. The visual signals from the display 68 or 68c can be distinguishable by way of color, flashing frequency, text message, arrows, travel direction of virtual moving lights, etc.

Figure 27:
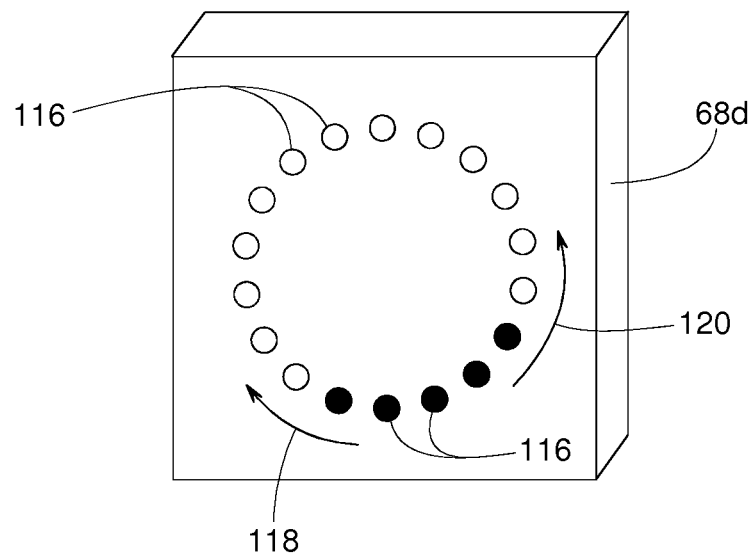
FIG. 27 is a perspective view of an example display constructed in accordance with the teachings disclosed herein.
Figure 28:
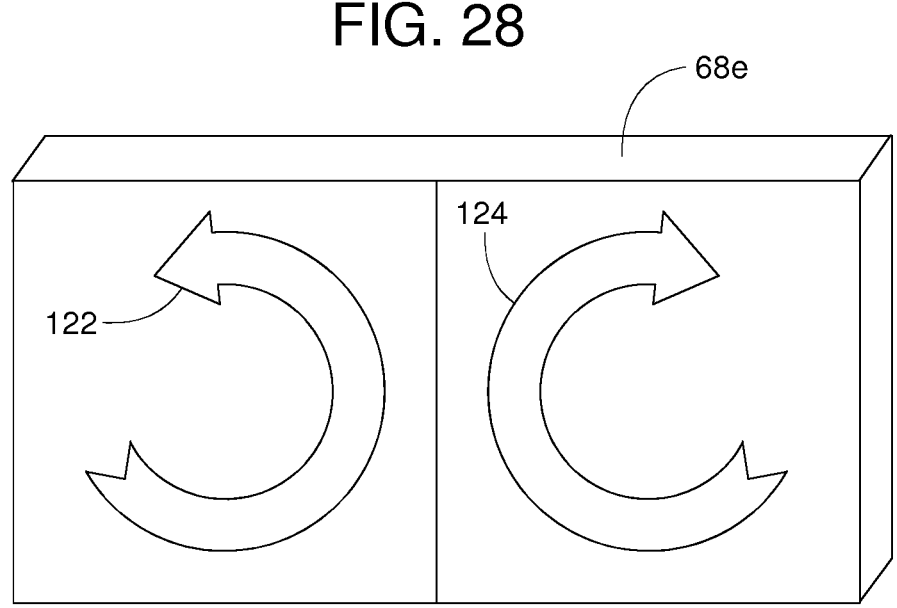
FIG. 28 is a perspective view of another example display constructed in accordance with the teachings disclosed herein.

FIG. 27, for example, shows a display 68d having an (e.g., a circular) array of lights 116 that are sequentially energized to create a visual illusion of movement in a rotational direction, e.g., a clockwise direction 118 or a counterclockwise direction 120. In some examples, the rotational direction indicates in which direction the vehicle 12 should be rotated to correct a misalignment. In some examples, the rotational direction indicates the angular direction that the vehicle 12 is misaligned. In some examples, the rotational direction indicates the direction the vehicle's driver should rotate the steering wheel in order to correct a lateral and/or angular misalignment. Additionally or alternatively, FIG. 28 shows the display 68e with separate arrow lights 122 and 124 for indicating clockwise or counterclockwise rotation.

Figure 29:
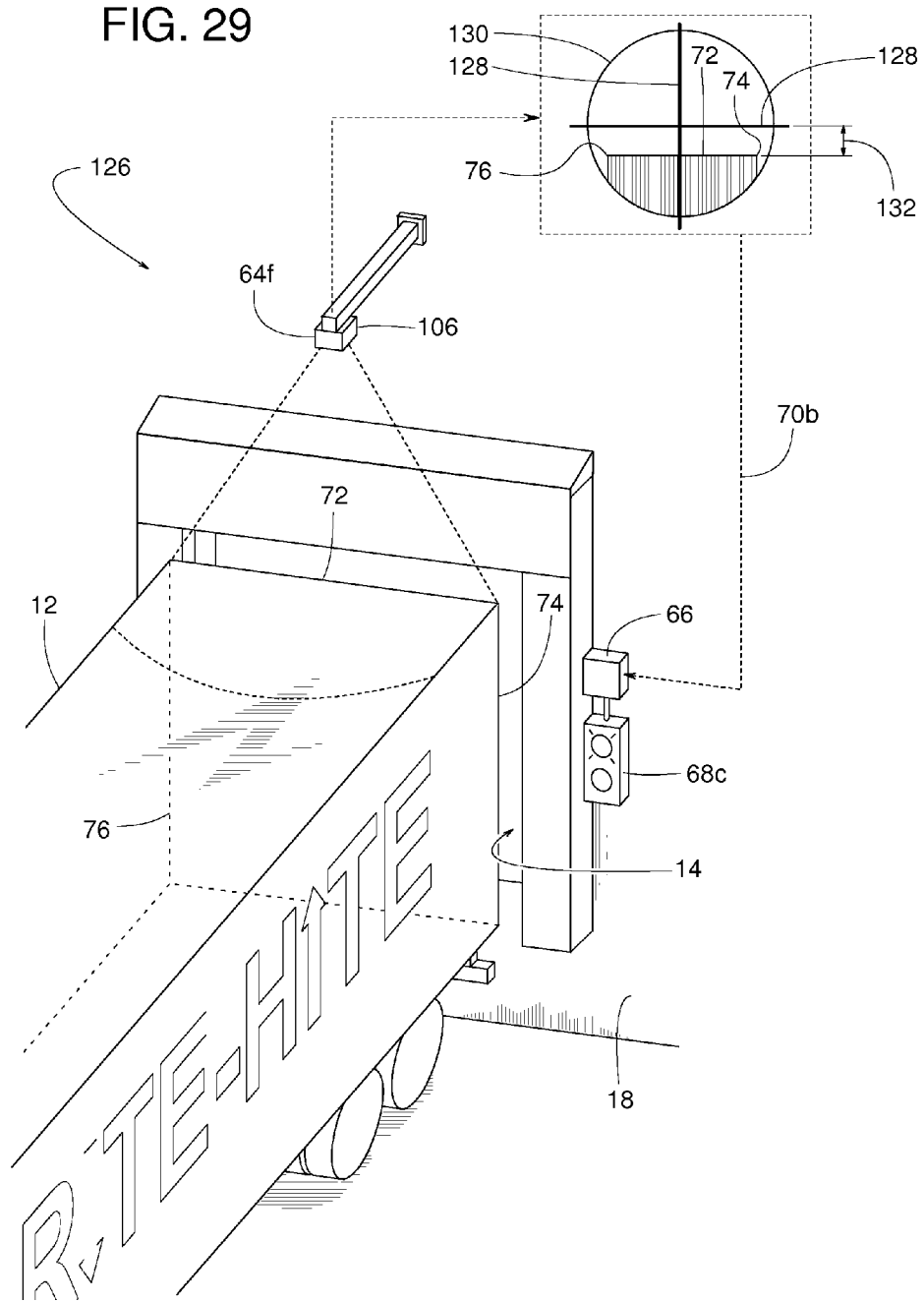
FIG. 29 is a perspective view of another example vehicle alignment system constructed in accordance with the teachings disclosed herein.
Figure 30:
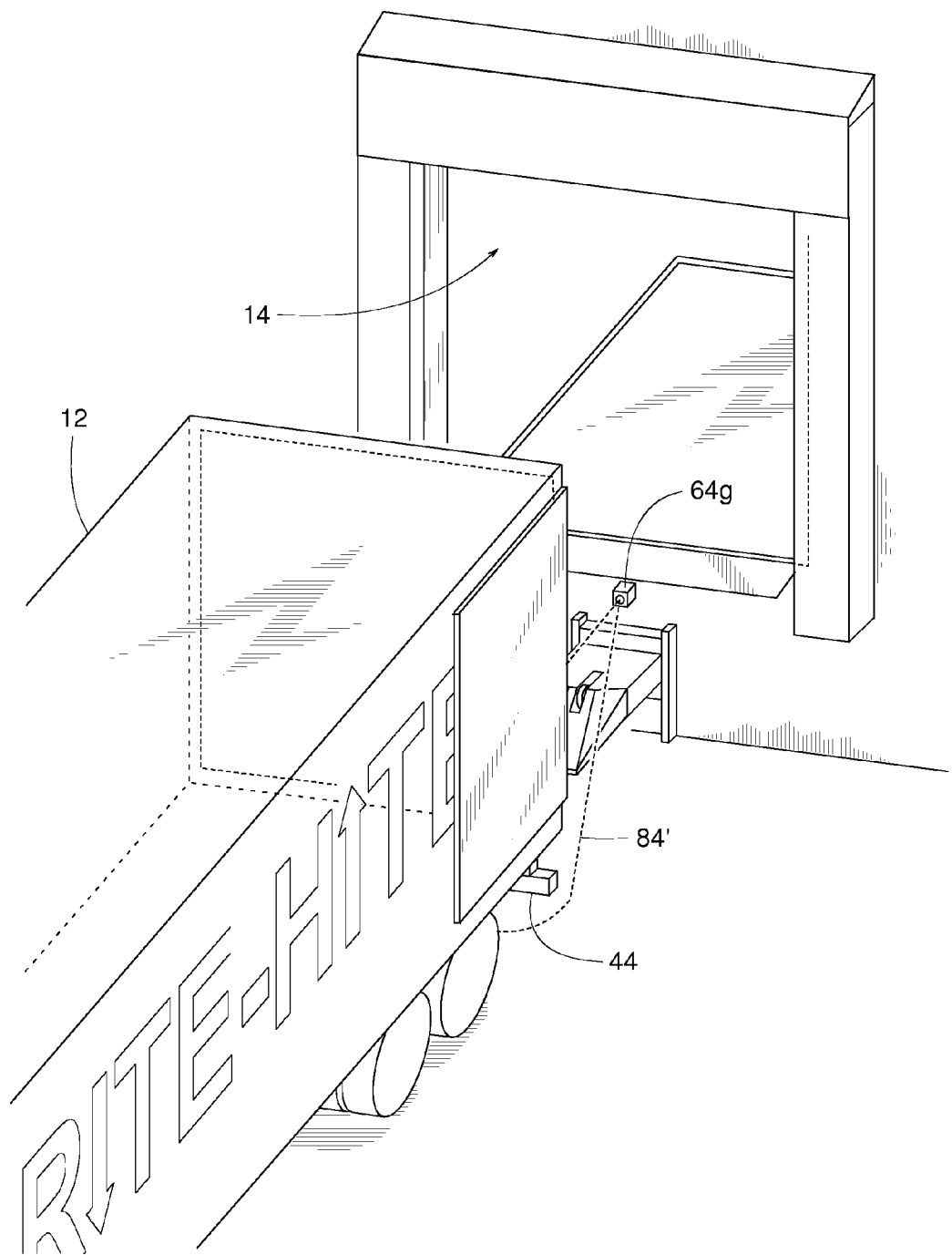
FIG. 30 is a perspective view of another example vehicle alignment system constructed in accordance with the teachings disclosed herein.

FIG. 29 shows an example vehicle alignment system 126 that is similar to the vehicle alignment system 104 shown in FIGS. 24-26. However, the sensor system 64f of the vehicle alignment system 126 of FIG. 29 has only one overhead camera 106 aimed to capture at least one image of the vehicle 12. Upon capturing the at least one image, the sensor system 64f generates an image signal 70b (feedback) including one or more images. The controller 66 receives and interprets the image signal 70b to determine whether the vehicle 12 is aligned (e.g., laterally centered (lateral position), angularly aligned (angular orientation), and/or sufficiently close to dock face 18 (front-to-back)). The controller 66 compares the image signal 70b to a reference 128 to determine whether the image signal 70b deviates (e.g., laterally, angularly, and/or front-to-back) beyond an acceptable limit.

Based on the comparison, the controller 66 commands the display 68c to indicate whether the vehicle's position or angular orientation (during approach or after docking) is acceptable or within one or more tolerance values. In the example of FIG. 29, the image 130 shows that during the vehicle's approach, the vehicle's rear edges 76 and 74 indicate that the vehicle 12 is aligned relative to the reference 128 (e.g., properly centered laterally and are angularly aligned). However, the controller 66 determines that, based on a dimension 132 the vehicle 12 of the illustrated example is spaced too far away from dock face 18 (e.g., the front-to-back being outside an acceptable threshold).

In some examples, such as those shown in FIGS. 30-42, various examples of the sensor system 64 (e.g., the sensor systems 64g and 64h) monitor the position and/or angular orientation of the RIG 44. The US Interstate Commerce Commission's standardization of RIGs can make the RIG 44 a more accurate or convenient target for monitoring than other structural features of the vehicle 12. As such, a reference (e.g., a template) having a shape and/or dimensions associated with a structural feature of interest (e.g., the RIG 44) may be compared with information acquired by the sensor system 64.

Figure 31:
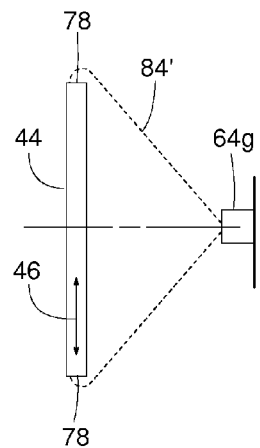
FIG. 31 is a schematic top view of the vehicle alignment system shown in FIG. 30.
Figure 32:
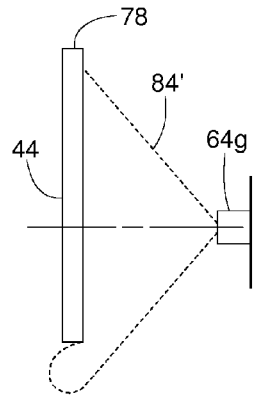
FIG. 32 is a schematic top view similar to FIG. 31 but showing an example vehicle's RIG offset in one direction relative to a longitudinal center line of the example alignment system.
Figure 33:
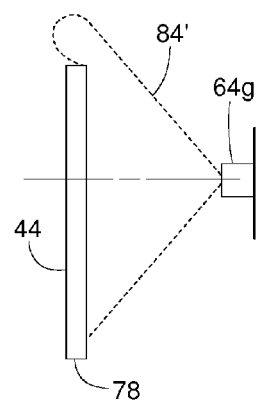
FIG. 33 is a schematic top view similar to FIG. 32 but showing the example vehicle's RIG offset in an opposite direction relative to the position shown in FIG. 32.

In the example of FIGS. 30-33, the sensor system 64g is installed below the dock doorway 14 with the sensor system's field of view or projection 84' aimed at the RIG 44. The controller 66 determines the RIG's lateral alignment based on the field of view's symmetry (e.g., FIG. 31) or lack of symmetry (e.g., FIGS. 32 and 33). FIG. 31 shows the RIG 44 laterally centered, FIG. 32 shows the RIG 44 offset laterally to one side (e.g., outside a desired alignment threshold), and FIG. 33 shows the RIG 44 laterally offset to the other side (e.g., outside a desired alignment threshold). In some examples, a similar sensing concept is used for detecting the angular orientation of the RIG 44.

Figure 34:
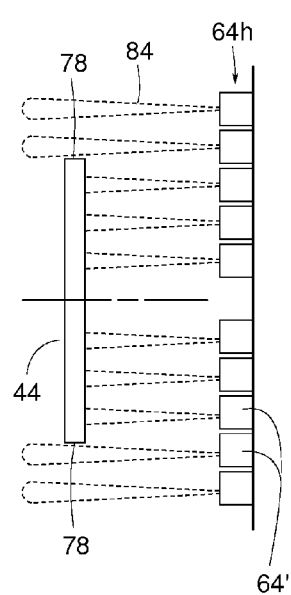
FIG. 34 is a schematic top view similar to FIG. 31 but showing another example vehicle alignment system constructed in accordance with the teachings disclosed herein.
Figure 35:
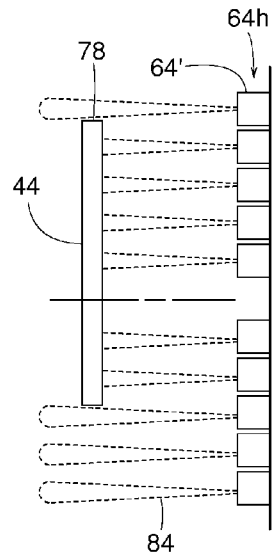
FIG. 35 is a schematic top view similar to FIG. 34 but showing an example vehicle's RIG offset in one direction relative to a longitudinal center line of the example alignment system.
Figure 36:
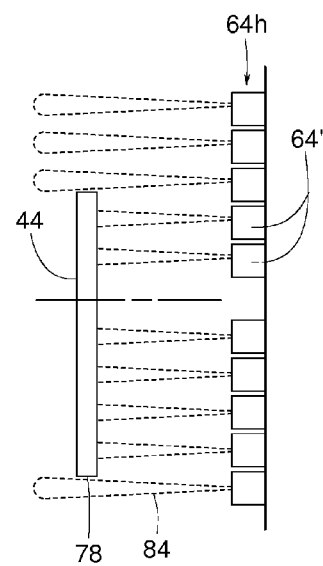
FIG. 36 is a schematic top view similar to FIG. 35 but showing the example vehicle's RIG offset in an opposite direction relative to the position shown in FIG. 32.

In the example shown in FIGS. 34-36, the sensor system 64h includes a series of sensors 64' operating in a manner similar to that shown in FIG. 19. In FIGS. 34-36, however, the sensors 64' detect lateral alignment and/or misalignment of the RIG 44 rather than the lateral alignment and/or misalignment of the vehicle's roof 38, as shown in FIG. 19. The controller 66 compares the feedback from sensors 64' to determine whether the vehicle's RIG 44 is laterally misaligned relative to a reference (e.g., a centerline of the vehicle restraint 58). FIG. 34 shows the RIG 44 laterally centered, FIG. 35 shows the RIG 44 offset laterally to one side (e.g., outside a desired alignment threshold), and FIG. 36 shows the RIG 44 laterally offset to the other side (e.g., outside a desired alignment threshold). In some examples, the example sensing system 64h may detect the angular orientation of the RIG 44 (e.g., similar to the example system 64i of FIGS. 40-42).

Figure 37:
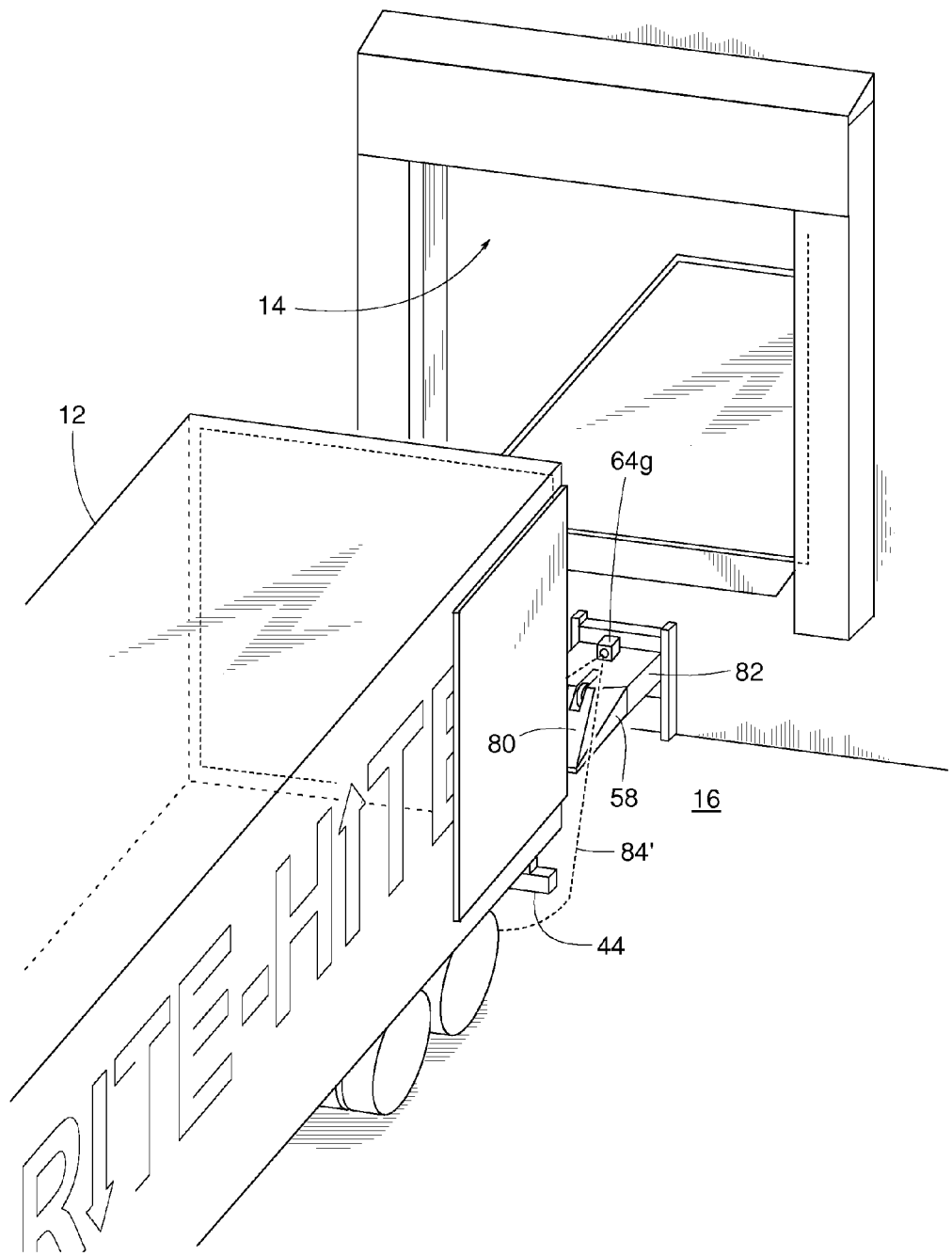
FIG. 37 is a perspective view of another example vehicle alignment system constructed in accordance with the teachings disclosed herein.

The example shown in FIGS. 37-39 is similar to the examples of FIGS. 30-36. However, in FIGS. 37-39, the example sensor system 64g aligns itself (e.g., vertically) relative to various elevations of the RIG 44. In some examples, after the vehicle 12 is restrained at the dock 16, the sensor system 64g has the ability to subsequently follow the vertical movement of the RIG 44 and/or the vehicle restraint 58. To enable the sensor system 64g to follow vertical movement of the RIG 44 and/or the vehicle restraint 58, the sensor system 64g is mounted to a vertically movable support. In some examples, such a vertically movable support is a main body 82 of the vehicle restraint 58. In other examples, the vertically movable support is separate from the vehicle restraint 58.

In the example illustrated in FIGS. 37-39, the sensor system 64g is attached to the main body 82 (attached either directly or via some suitable bracket), and a spring or biasing element 134 (e.g., or comparable actuator) urges the main body 82 upward to a stored position (FIGS. 37 and 39). In some examples, the vehicle 12 backing into the loading dock 16 from the position of FIG. 4 to that of FIG. 5 forces the main body 82 downward underneath the RIG 44. As a result, the sensor system 64g is positioned at the same elevation as the RIG 44. Thus, due to the spring 134, the main body 82 and the sensor system 64g follow (e.g., continuously) any subsequent vertical movement of the RIG 44. Such movement of the RIG 44 can occur due to cargo and/or other weight being added and/or removed from the vehicle 12. FIG. 38 shows the RIG 44, the main body 82 and the sensor system 64g at a first elevation (e.g., aligned at a height relative to a driveway on which the vehicle is parked or a floor of the loading dock 16), and FIG. 39 shows the RIG 44, the main body 82 and the sensor system 64g at a second or lower elevation different than the first elevation. At these two elevations and at various intermediate elevations between these two example elevations, the sensor system 64g remains vertically aligned relative to the RIG 44.

FIGS. 40-42 show the sensor system 64i having two sensors 64' to monitor the angular orientation of the RIG 44. The example sensor system 64i can be mounted to any suitable structure 136. Examples of the structure 136 include, but are not limited to, the vehicle restraint 58, the main body 82, the dock face 18, the platform 50, the dock leveler 28, a bracket, etc. FIG. 40 shows a top view of the RIG 44 aligned angularly relative to a reference within an acceptable threshold (e.g., having the proper angular orientation), FIG. 41 shows the top view of the RIG 44 being angularly misaligned in one direction (e.g., outside of the alignment threshold), and FIG. 42 shows the top view of the RIG 44 being misaligned (e.g., outside of the alignment threshold) in the opposite direction. The controller 66 interprets the feedback from the sensor system 64i to determine whether the vehicle's RIG 44 is in proper angular alignment and/or is at a desired or proper distance from structure 136.

The sensor system 64i of FIG. 43 is similar to the sensor system 64i of FIGS. 40-42. However, in FIG. 43, the sensor system 64i is positioned to sense a rear surface 32 or some other feature of the vehicle 12 other than the RIG 44 (e.g., a vertical or horizontal edge of the vehicle defining the cargo bay opening of a trailer). The controller 66 interprets the feedback from the sensor system 64i to determine whether the vehicle 12 is in proper angular alignment and/or is within a desired or proper distance from the dock doorway 14 for safe loading and/or unloading operations.

In the example shown in FIG. 44, a bracket 138 aims sensor system 64j to lateral side 36 of vehicle 12. Sensor system 64j includes two spaced apart sensors 64' to monitor the angular orientation of vehicle 12.

Although numerous mounting locations for various examples of the sensor system 64 are disclosed herein, example methods, apparatus, systems and/or articles of manufacture disclosed herein are not limited thereto. In some examples, for instance, the sensor system 64 is installed in a location for not only detecting the position and/or orientation of the vehicle 12, but is installed so as to also detect the position or movement of various dock-related equipment such as, for example, the deck 54, the lip 56, the vehicle restraint 58, a door associated with the dock doorway 14, and/or a door of vehicle 12. In some examples, the sensor system 64 includes one or more sensors installed within an interior of the building 52 with the sensor's projection 84 or 84' passing through the dock doorway 14.

Figure 45:
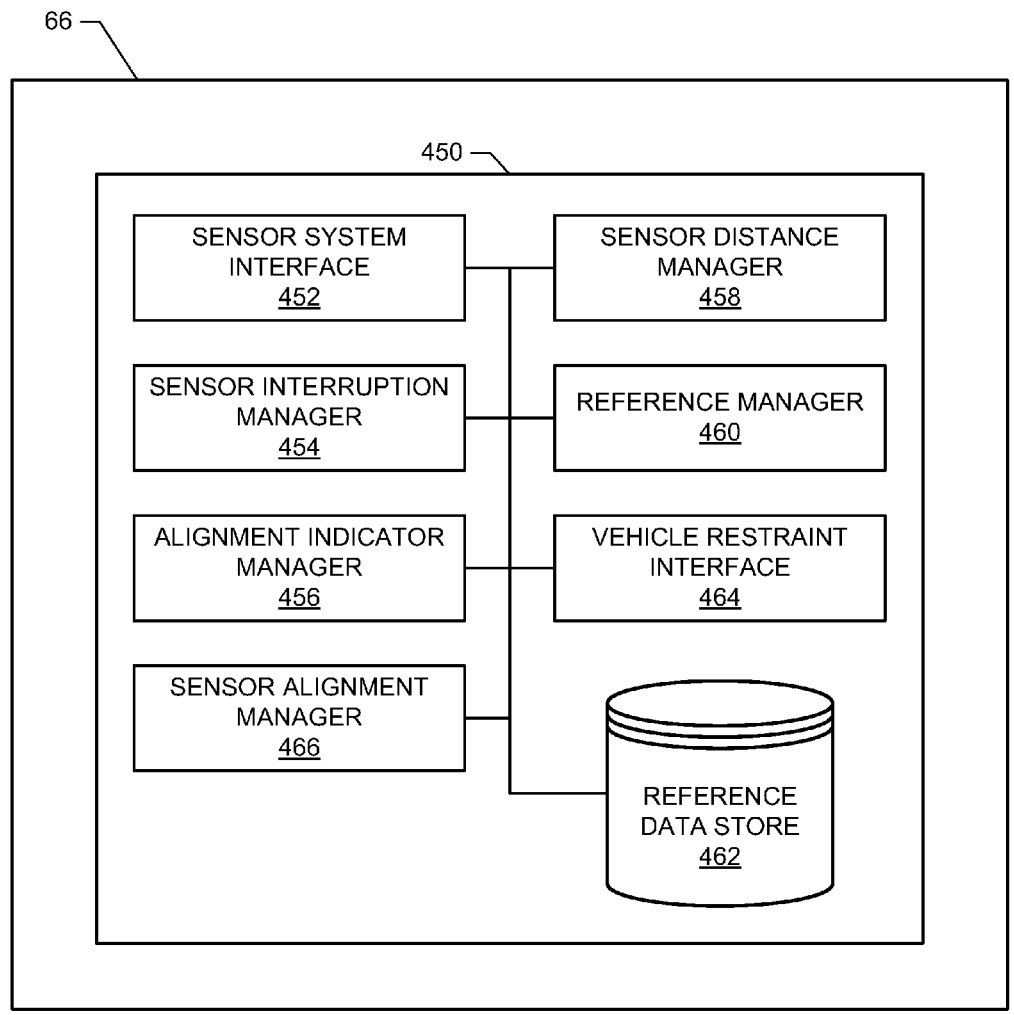
FIG. 45 is a schematic illustration of a vehicle alignment manager constructed in accordance with the teachings of this disclosure to monitor vehicle alignment.

FIG. 45 is a block diagram representative of an example implementation of the example controller 66 of FIGS. 1-44. In the illustrated example of FIG. 45, the controller 66 includes a vehicle alignment manager 450, a sensor system interface 452, a sensor interruption manager 454, an alignment indicator manager 456, a sensor distance manager 458, a reference manager 460, a reference data store 462, a vehicle restraint interface 464, and a sensor alignment manager 466. The example sensor system interface 452, the example sensor interruption manager 454, the example alignment indicator manager 456, the example sensor distance manager 458, the example reference manager 460, the example reference data store 462, the example vehicle restraint interface 464, the example sensor alignment manager 466, and the example vehicle alignment manager 450 are communicatively connected via an example communication bus 468.

In operation, the example sensor system interface 452 facilitates control and data acquisition of one or more sensors of the example sensor system 64. As described above, example sensors of the sensor system 64 may include, but are not limited to example sensor systems 64a-j shown in FIGS. 7-44 that employ active infrared, passive infrared, ultrasonic, radar, microwave, laser, electromagnetic induction, pressure, electromechanics, ultra-IR LED, time-of-flight pulse ranging, photoelectric, video analytics, and/or photo analytics. The example sensor system interface 452 obtains information from the sensor system 64 via the feedback signal(s) 70, which represent a binary value (e.g., on/off), a digital value, an analog value, an image and/or a video. In some examples, the sensor system 64 retrieves, receives and/or otherwise obtains information from the feedback signal(s) as a voltage signal (e.g., a direct current voltage value) that, when compared to a sensor device look-up table (reference) reveals a corresponding physical state (e.g., a pressure value in pounds per square inch, a distance in centimeters, etc.). While the aforementioned example refers to a voltage signal, example methods, systems, apparatus and/or articles of manufacture disclosed herein are not limited thereto. In some examples, the sensor system 64 obtains a current value (e.g., 4-20 milliamp) such that circuit break detection may be identified and/or to obtain error resistant measurements in relatively noisy (e.g., electromagnetic noise) environments.

The example sensor interruption manager 454 of the illustrated example of FIG. 45 identifies instances when a sensor 64, such as the example overhead sensors 64' (sensors 64a and/or sensors 64b) shown in FIGS. 8-19, is/are interrupted or non-interrupted. As described above, the example overhead sensors 64' emit and/or receive a beam projection (e.g., active infrared, passive infrared, ultrasonic, radar, microwave, laser, ultra-IR-LED, time-of-flight pulse, photoelectric, etc.) to detect the presence or absence of the vehicle 12. In some examples, the beam projection sensors (e.g., overhead sensors 64' of FIGS. 8-19) provide a binary output as either on or off (e.g., zero or one) depending on whether an object breaks/interrupts the beam.

However, in still other examples, the employed sensors 64 generate an output value indicative of a distance from an object (see sensor system 64c of FIGS. 20 and 21), such as a distance from a lateral side (e.g., the first lateral side 34, the second lateral side 36, etc.) of the vehicle 12. The example sensor distance manager 458 of FIG. 45 receives, retrieves and/or otherwise obtains the output signal from the sensor system 64c and determines a corresponding distance to the object that intersects the beam projection 84.

In some examples, the employed sensors 64 are electromechanical in nature and, when such sensors make physical contact with one or more portions of the example vehicle 12, an output signal indicative of contact is received, retrieved and/or otherwise obtained by the example sensor interruption manager 454. For example, FIGS. 22 and 23 illustrate the sensor system 64d that is triggered in response to the actuator 102 engaging one of the vehicle's first lateral side 34 or second lateral side 36. While the illustrated examples of FIGS. 22 and 23 include the first lateral side 34 or the second lateral side 36, example methods, apparatus, systems and/or articles of manufacture disclosed herein are not limited thereto. Any other portion(s) of the example vehicle 12 may contact the example actuator 102 to cause an indication of alignment. In some examples, the indication of alignment (or misalignment) may be a binary signal from the sensor system 64d, in which the actuator 102 is either contacted or non-contacted (not engaged via contact by the vehicle 12). In some examples, the sensor system 64d produces discrete values of varying degrees of contact that range from non-contact to a maximum contact value indicative of a distance value.

In some examples, the sensor system interface 452 interacts with sensors that acquire video and/or picture images to be used with one or more reference templates to determine alignment and/or misalignment conditions. In the illustrated examples of FIGS. 24-26 and 29, the example sensor system interface 452 communicates with the sensor system 64e and the sensor system 64f, which include one or more cameras 106. As described above, the example cameras 106 capture video or still images of one or more portions of the vehicle 12. Images captured by the example cameras 106 are analyzed by the example reference manager 460 to determine whether an alignment violation condition is true. In some examples, the reference manager 460 retrieves, receives and/or otherwise receives reference template(s) from the example reference data store 462. In the illustrated example of FIG. 24, the reference 110 includes a Cartesian coordinate axis (e.g., the horizontal axis 110x and the vertical axis 110y) as a template to which one or more images captured by the camera(s) 106 is/are compared. In the event the captured image crosses and/or otherwise impedes the example reference 110, the vehicle alignment manager 450 deems a misalignment condition to be true.

In some examples, the vehicle alignment manager 450 invokes the reference manager 460 to determine whether the vehicle 12 includes standardized equipment. As described above, the US Interstate Commerce Commission has standardized RIGs such that parameters (dimensions) thereof are consistently employed on vehicles 12. Such dimensions are, in some examples, stored in the example reference data store 462 and, when compared by the example reference manager 460 to sensor 64 input, determine the presence or absence of standardized equipment on the example vehicle 12, as shown in FIGS. 30-36.

In some examples, the vehicle alignment manager 450 identifies instances of alignment and/or misalignment after the vehicle 12 is restrained to the loading dock 16. As described above, the example sensor system 64g is installed in a manner to align with one or more vertical positions of the vehicle 12 by way of its placement on the example vehicle restraint 58 or a main body 82 of the vehicle restraint. For instance, movement of the example vehicle 12 may occur after being restrained due to cargo and other weight being added or removed from the vehicle 12, as shown in FIGS. 37-39. The example vehicle restraint interface 464 monitors the state of the example movable barrier to determine whether the vehicle 12 is restrained or not restrained. In response to the example vehicle restraint interface 464 determining that the vehicle 12 is restrained, the example sensor alignment manager 466 identifies one or more reference points of the vehicle 12, such as an orientation of the example RIG 44. A value associated with the initial orientation of the example RIG 44 is stored in a memory, such as in the example reference data store 462, for later comparison that may identify one or more instances of misalignment. For example, in the event the example vehicle 12 is initially restrained to the example dock 16 in an unloaded condition, and an excess amount of cargo is loaded onto the vehicle 12, the example sensor system 64g value is compared to the initial value to determine if one or more thresholds is/are exceeded. As such, misalignment conditions may be identified before during cargo loading and/or unloading.

When any of the example sensor interruption manager 454, example sensor distance manager 458 and/or the example reference manager 460 indicate a condition of alignment and/or misalignment, the example alignment indicator manager 456 generates one or more signals to cause a display to alert personnel of alignment and/or misalignment. In some examples, the alignment indicator manager 456 generates control signals for the display 68 of FIGS. 1-3, 6, 8-19, 21, 24-29 and 38. As described above, the example display 68 may operate in any configuration of illumination or shape.

While an example manner of implementing the controller 66 of FIGS. 1-44 is illustrated in FIG. 45, one or more of the elements, processes and/or devices illustrated in FIG. 45 may be combined, divided, re-arranged, omitted, eliminated and/or implemented in any other way. Further, the example sensor system interface 452, the example sensor interruption manager 454, the example alignment indicator manager 456, the example sensor distance manager 458, the example reference manager 460, the example reference data store 462, the example vehicle restraint interface 464, the example sensor alignment manger 466 and/or, more generally, the example vehicle alignment manager 450 of FIG. 45 may be implemented by hardware, software, firmware and/or any combination of hardware, software and/or firmware. Thus, for example, any of the example sensor system interface 452, the example sensor interruption manager 454, the example alignment indicator manager 456, the example sensor distance manager 458, the example reference manager 460, the example reference data store 462, the example vehicle restraint interface 464, the example sensor alignment manger 466 and/or, more generally, the example vehicle alignment manager 450 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor system interface 452, the example sensor interruption manager 454, the example alignment indicator manager 456, the example sensor distance manager 458, the example reference manager 460, the example reference data store 462, the example vehicle restraint interface 464, the example sensor alignment manger 466 and/or, more generally, the example vehicle alignment manager 450 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle alignment manager 450 of FIG. 45 may include one or more elements, processes and/or devices in addition to, or instead of, those illustrated in FIG. 45, and/or may include more than one of any or all of the illustrated elements, processes and devices.

Flowcharts representative of example machine readable instructions for implementing the vehicle alignment manager 450 of FIG. 45 are shown in FIGS. 46-51. In these examples, the machine readable instructions comprise one or more programs for execution by a processor such as the processor 5212 shown in the example processor platform 5200 discussed below in connection with FIG. 52. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 46-51, many other methods of implementing the example vehicle alignment manager 450 may alternatively be used. For example, the order of execution of the blocks may be changed, and/or some of the blocks described may be changed, eliminated, or combined.

As mentioned above, the example processes of FIGS. 46-51 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 46-51 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 46:
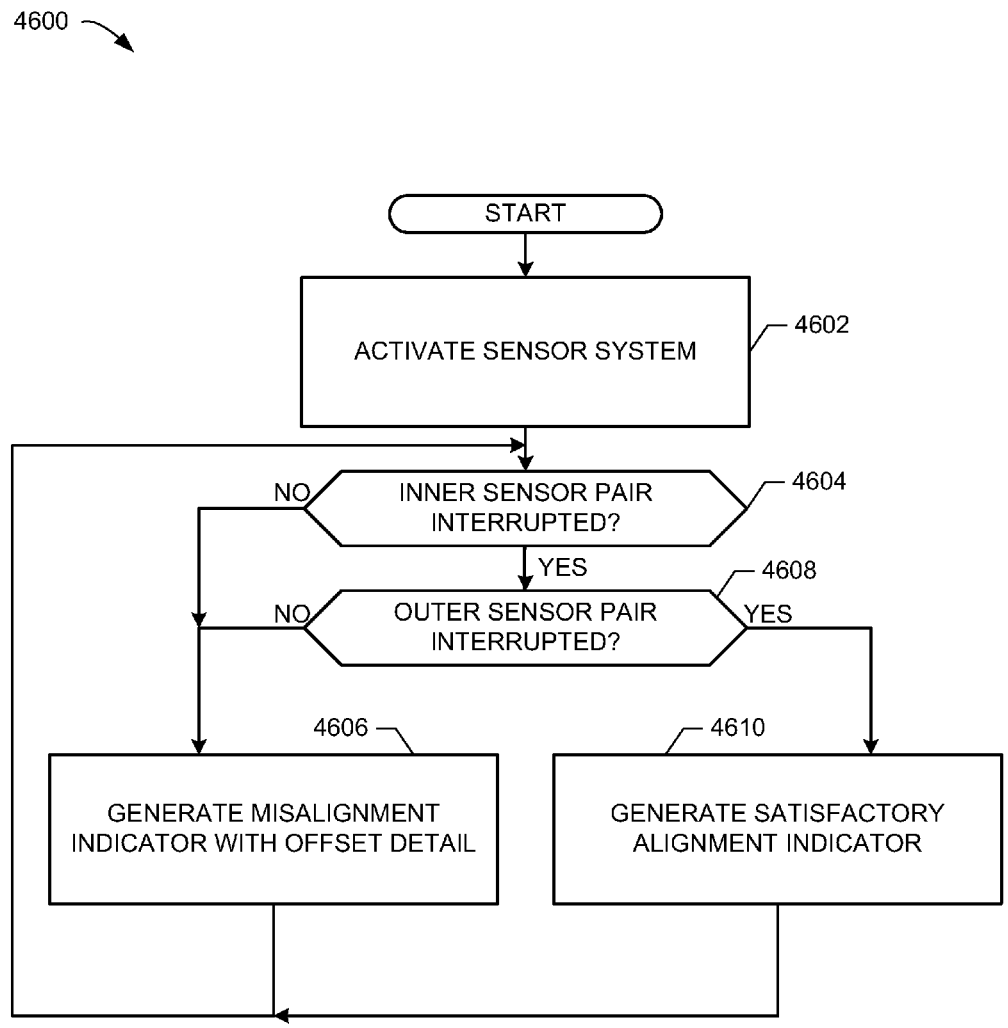
FIGS. 46-51 are a flowcharts representative of example machine readable instructions that may be executed to monitor one or more sensor systems to determine an alignment status.

The program 4600 of FIG. 46 begins at block 4602 where the example sensor system interface 452 activates the sensor system(s) 64a and/or sensor system(s) 64b, as shown in the illustrated examples of FIGS. 7-19. In the illustrated example of FIG. 46, the sensor system 64a and/or the sensor system 64b activated by the sensor system interface 452 produces a beam-like projection 84 that, when broken and/or otherwise occluded by a portion of the vehicle 12, generates a binary output. In some examples, the sensor system 64a generates a logical TRUE value (e.g., voltage high, "1," etc.) when the projection 84 is unbroken, and a logical FALSE value (e.g., voltage low, "0," etc.) when the projection 84 is broken. In other examples, the logical output is reversed.

In some examples, pairs of sensors are employed to identify vehicles of different sizes, in which some vehicles are wider than other vehicles. In the illustrated examples of FIGS. 8-18, an outer sensor pair is employed to detect the lateral alignment of generally wider examples of the vehicle 12 and an inner sensor pair is employed to detect the lateral alignment of generally narrower examples of the vehicle 12. The example sensor interruption manager 454 receives, retrieves and/or otherwise obtains an output signal from the example inner sensor pair to determine whether the projection 84 is broken (block 4604). If the projection 84 of the inner sensor pair is not broken (block 4604) (e.g., only one projection 84 of one of the sensors 64' of the inner sensor pair of the example of FIGS. 14-18 is broken), then the example alignment indicator manager 456 causes one or more displays 68 to generate an indication of misalignment in a manner consistent with the example of FIGS. 16 and 18 (block 4606). Additionally, the example alignment indicator manager 456 causes the one or more displays 68 to generate detailed information regarding a manner of offset detail, such as an indication that a driver of the vehicle 12 should adjust in a rightward direction (see FIG. 16), or that the driver of the vehicle 12 should adjust in a leftward direction (see FIG. 18) (block 4606).

In the event that the vehicle 12 is identified as breaking and/or otherwise interrupting the projection 84 for the inner sensor pair (block 4604), then the example sensor interruption manager 454 determines whether one or more of the sensors of the outer sensor pair is uninterrupted and/or otherwise not occluded by an object (block 4608). If both of the sensors of the example outer sensor pair are unbroken in a manner consistent with the example of FIGS. 9, 10 and 12, then the example alignment indicator manager 456 causes the one or more displays 68 to generate an indication of alignment (block 4610). However, in the event that one of the sensors of the outer sensor pair is blocked (block 4608), which is an indication of a condition of misalignment as shown in example FIGS. 11 and 13, then the example alignment indicator manager 456 causes the one or more displays 68 to generate an indication of misalignment. Additionally, the example alignment indicator manager 456 causes the one or more displays 68 to include detailed information regarding a manner of how the vehicle 12 is misaligned, thereby affording the driver an opportunity to apply corrective action(s). For instance, the illustrated example of FIG. 11 illustrates the leftmost outer sensor 64' blocked and the display 68a illuminates a left arrow light 88, while the illustrated example of FIG. 13 illustrates the rightmost outer sensor 64' blocked and the display 68a illuminates a right arrow light 90. In operation, the example program 4600 of FIG. 46 may repeat as needed to continually provide feedback to the operator of the vehicle 12 during one or more attempts to dock.

Figure 47:
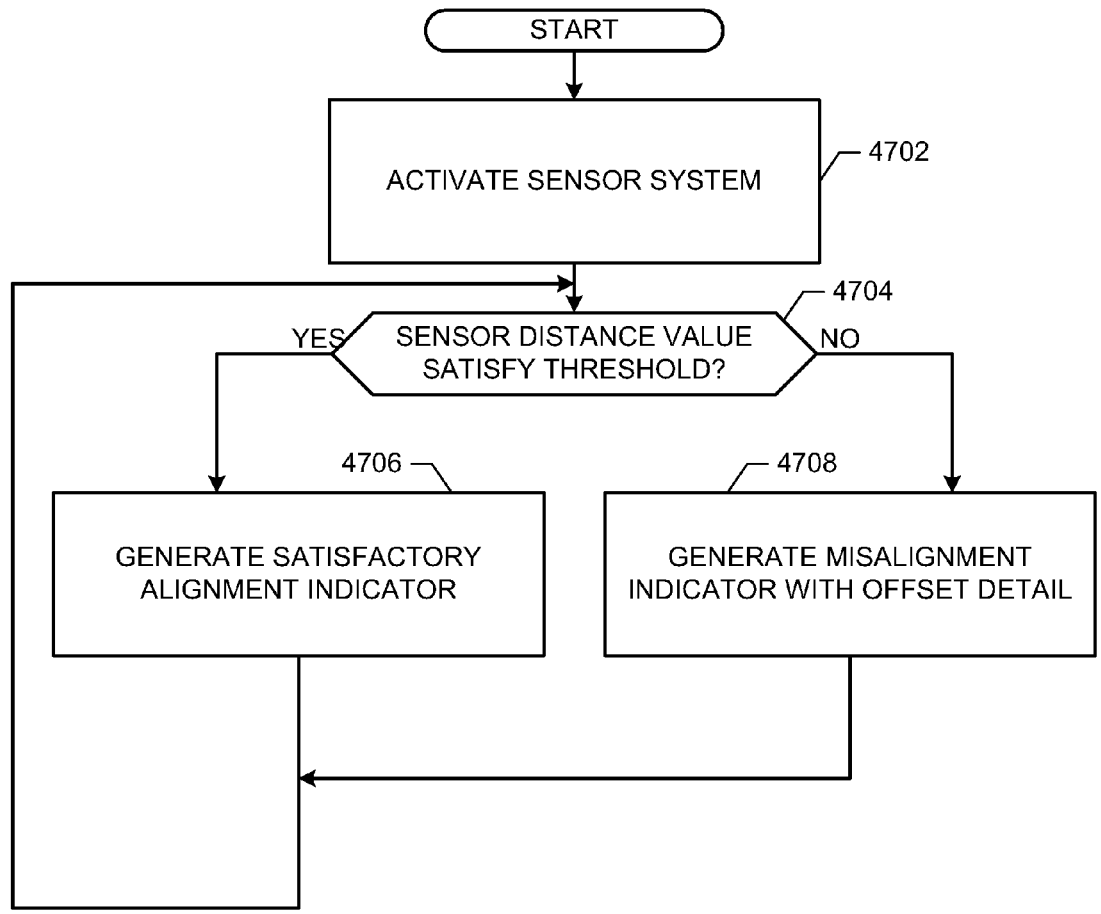

The program 4700 of FIG. 47 begins at block 4702 where the example sensor system interface 452 activates the sensor system(s) 64c, as shown in the illustrated examples of FIGS. 20 and 21. In the illustrated example of FIG. 47, the sensor system 64c activated by the sensor system interface 452 produces a beam-like projection 84 that generates feedback indicative of a distance from an object occluding the beam-like projection 84. The example sensor distance manager 458 determines whether a portion of the vehicle 12 (e.g., a first lateral side 34, a second lateral side 36, a rear surface 32, a RIG 44, etc.) satisfies (e.g., remains below) a threshold distance value (block 4704). If so, then the example alignment indicator manager 456 causes one or more displays 68 to generate an indication of alignment (block 4706), otherwise the example alignment indicator manager 456 generates an indication of misalignment (block 4708). Additionally, the example alignment indicator manager 456 may generate additional detail and/or signals to cause the one or more displays 68 to convey corrective action(s) to be taken by a driver of the vehicle 12 when misalignment occurs.

Figure 48:
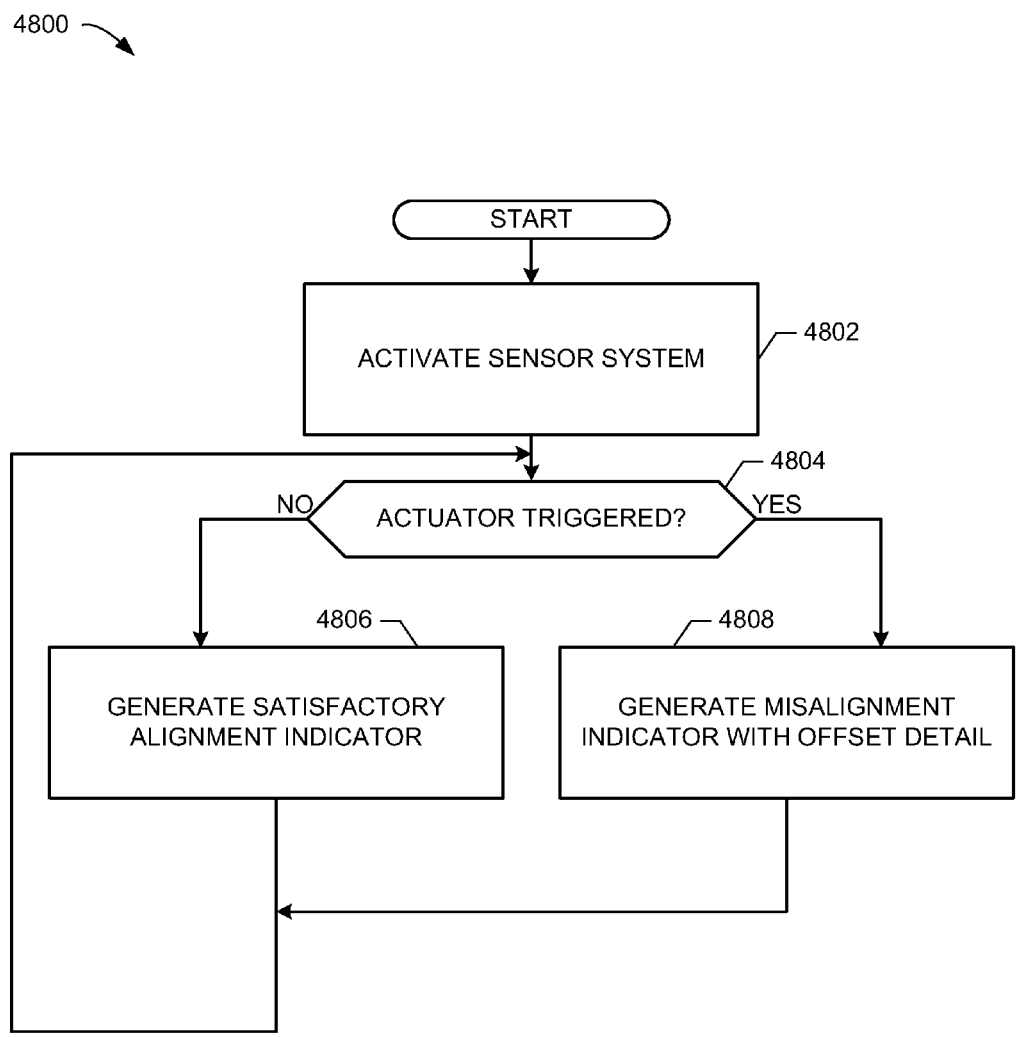

The program 4800 of FIG. 48 begins at block 4802 where the example sensor system interface 452 activates the sensor system(s) 64d, as shown in the illustrated examples of FIGS. 22 and 23. In the illustrated example of FIG. 48, the sensor system 64d includes an electromechanical switch (e.g., a limit switch) that produces a binary feedback signal to indicate a tripped condition or untripped condition. In some examples, a tripped condition is represented by a logical TRUE signal (e.g., high voltage, "1," etc.) and an untripped condition is represented by a logical FALSE signal (e.g., low voltage, "0," etc.). In some examples, the sensor system 64d generates a feedback signal indicative of a linear amount by which the switch is moved.

In the illustrated example of FIG. 48, the sensor system 64d produces a binary feedback signal, and the sensor interruption manager 454 determines whether the actuator 102 is triggered (block 4804). If not, then the example alignment indicator manager 456 causes one or more displays 68 to generate an indication of alignment (block 4806). On the other hand, in the event the example sensor interruption manager 454 determines that the actuator 102 is triggered (block 4804), as shown in the illustrated example of FIG. 23, then the example alignment indicator manager 456 causes one or more displays 68 to generate an indication of misalignment (block 4808).

Figure 49:
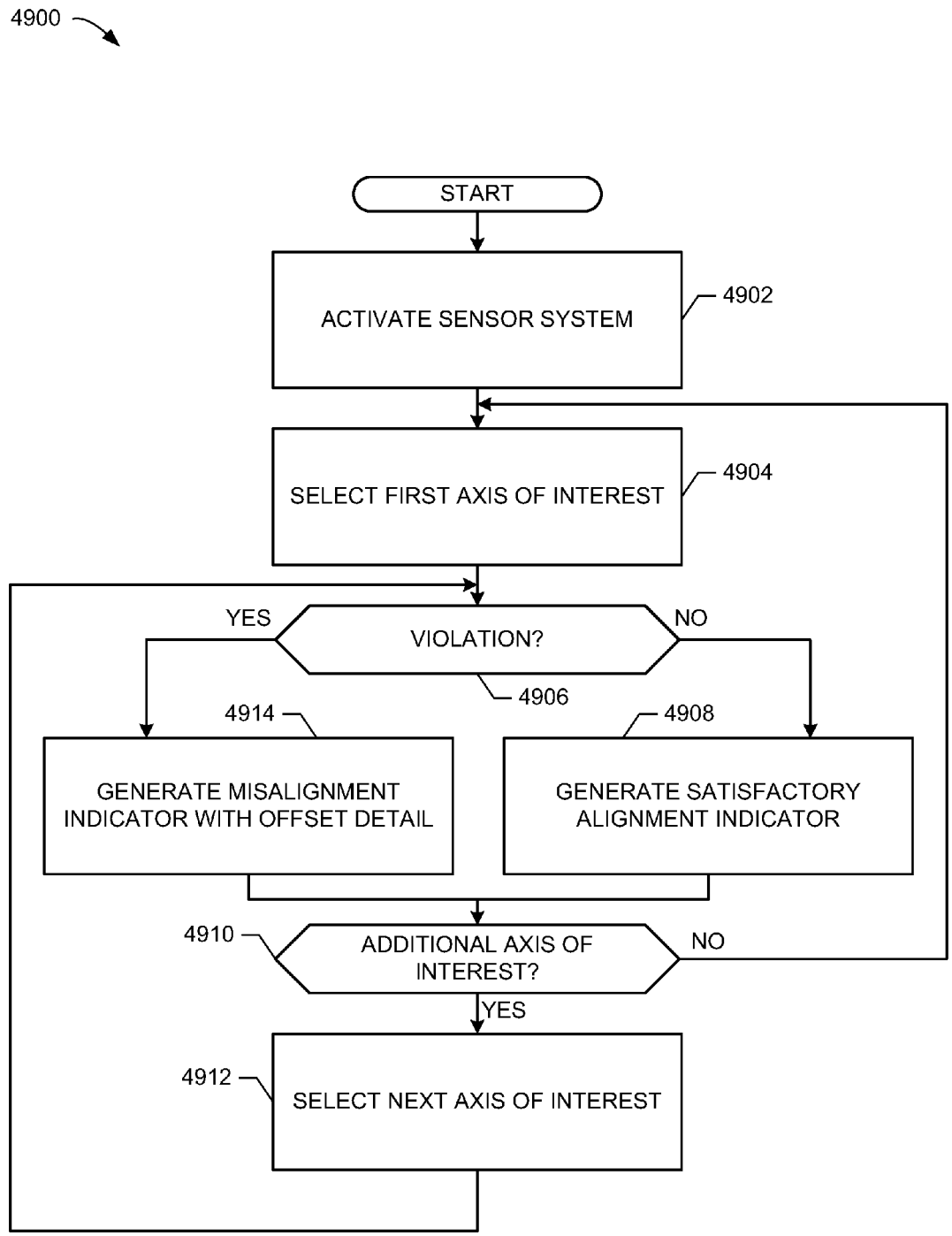

The program 4900 of FIG. 49 begins at block 4902 where the example sensor system interface 452 activates the sensor system(s) 64e and/or sensor system(s) 64f, as shown in the illustrated examples of FIGS. 24-26 and 29. In the illustrated example of FIG. 49, the reference manager 460 queries the reference data store 462 to obtain a reference 110 (block 4904) to which feedback from sensor(s) may be compared to identify instances of alignment and misalignment. As described above, an example reference 110 is shown in FIG. 24 to include a horizontal axis 110x and a vertical axis 110y. The example reference manager 460 compares the acquired feedback signal from the example sensor system 64e (e.g., a video signal) with the first axis of interest (block 4904), such as the horizontal axis 110x, and determines whether a violation occurs (block 4906). If no violation occurs (block 4906), then the example alignment indicator manager 456 causes one or more displays 68 to generate an indication of alignment (block 4908), and the example reference manager 460 determines whether an additional axis of interest is to be checked for a violation (block 4910). If not, control returns to block 4904 to continue monitoring the first axis of interest. However, if the example reference manager 460 determines that another axis of interest is to be checked (block 4910), the example reference manager selects the next axis of interest (e.g., the vertical axis 110y) (block 4912), and control returns to block 4906 to determine whether the additional axis of interest invokes a violation condition. In the event the example reference manager 460 identifies that any axis of interest causes a violation (block 4906), the example alignment indicator manager 456 causes the one or more displays 68 to generate an indication of misalignment in a manner consistent with the examples of FIGS. 27 and/or 28 (block 4914). As described above, monitoring programs, such as the example program 4900 of FIG. 49, may operate in a loop fashion to continuously monitor for alignment and/or misalignment conditions during one or more attempts by a driver to dock the example vehicle 12.

Figure 50:
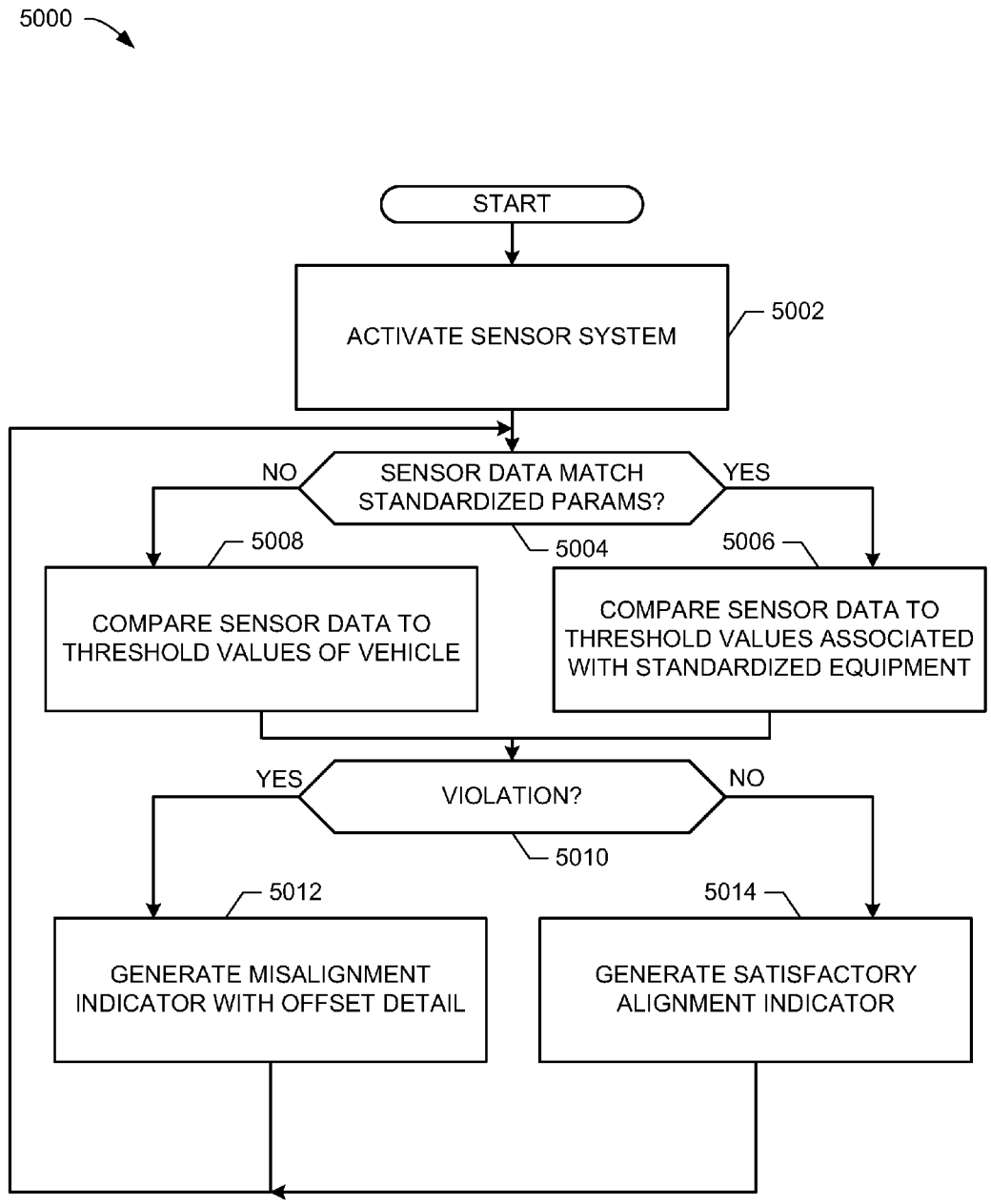

The program 5000 of FIG. 50 begins at block 5002 where the example system interface 452 activates the sensor system(s) 64g-i, as shown in the illustrated examples of FIGS. 30-36. The sensor system(s) may employ any sensing technique such as, but not limited to, video, still image, light sensors, arrays of sensors, etc. The example reference manager 460 invokes the example reference data store 462 to acquire information (e.g., a template) indicative of standardized component(s) that may be on the example vehicle 12. As described above, standardized RIG devices may be constructed in a manner having physical dimensions that are consistent across many vehicles. The example reference manager 460 determines whether the sensor system(s) 64g-i match one or more standardized equipment parameters (block 5004). If so, then the example reference manager 460 compares retrieved, received and/or otherwise obtained sensor data with orientation thresholds relative to the identified standardized component (e.g., the RIG 44) (block 5006). On the other hand, if one or more standardized components of the vehicle 12 are not identified (block 5004), then the example reference manager 460 compares retrieved, received and/or otherwise obtained sensor data with orientation thresholds relative to physical features of the example vehicle 12, such as a rear surface (block 5008). In either case, the reference manager 460 determines whether a violation occurs (block 5010). If not, the example alignment indicator manager 456 causes one or more displays 68 to generate an indication of alignment (block 5012). However, in the event the example reference manager 460 determines a violation (block 5010), the example alignment indicator manager 456 causes one or more displays 68 to generate an indication of misalignment (block 5014).

Figure 51:
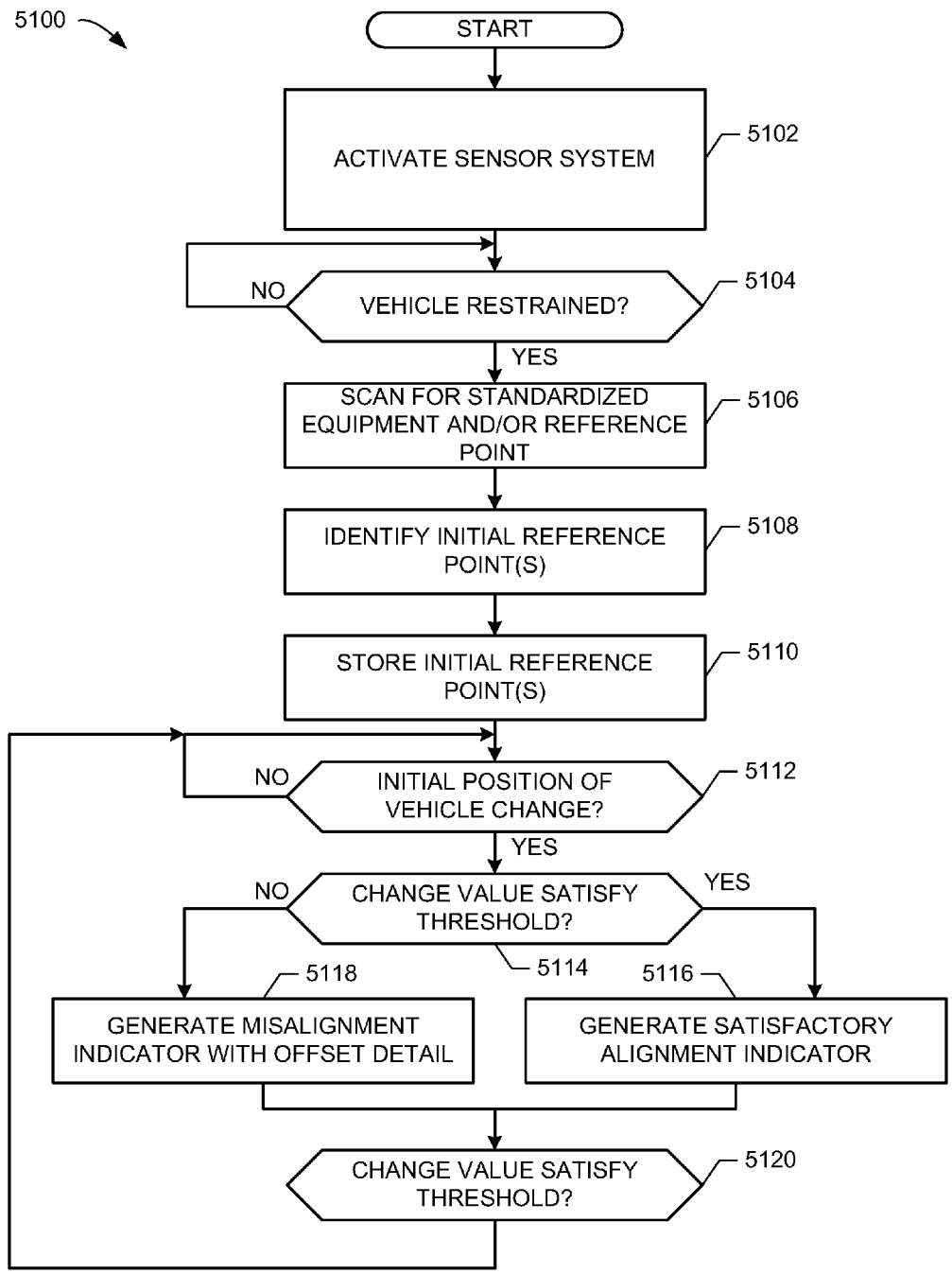

The program 5100 of FIG. 51 begins at block 5102, where the example sensor system interface 452 activates the sensor system(s) 64g, as shown in the illustrated examples of FIGS. 37-39. In the illustrated example of FIG. 51, the vehicle restraint interface 464 determines whether the vehicle 12 is restrained and/or otherwise locked to the loading dock 16 (block 5104). If not, the example program 5100 awaits for one or more indications that the vehicle 12 is restrained, otherwise in response to an indication that the vehicle 12 is restrained (block 5104), the example reference manager 460 scans for standardized equipment that may be attached to or otherwise a part of the vehicle 12 (block 5106). In some examples, if the vehicle 12 does not have one or more pieces of standardized equipment, the example sensor system(s) 64g identify one or more reference points of the example vehicle 12, such as a front edge 24.

When the reference point is identified (block 5106), the example sensor alignment manager 466 identifies one or more reference point(s) (block 5108) and stores the associated initial orientation information in the example reference data store 462 (block 5110). As descried above, one or more aspects of the example vehicle 12 may change in response to loading or unloading of the vehicle 12.

In the event the reference manager 460 identifies a change from the initial position of the vehicle 12 (block 5112), the new position/orientation information (e.g., a distance in inches) is compared to a threshold (block 5114), such as a threshold stored in the example reference data store 462. If the example threshold value is satisfied (block 5114), the example alignment indicator manager 456 causes one or more displays 68 to generate an indication of alignment (block 5116). However, if the example threshold value is not satisfied (e.g., exceeded) (block 5114), then the example alignment indicator manager 456 causes one or more displays 68 to generate an indication of misalignment (block 5118). In some examples, the indication of misalignment may indicate an overload condition warning message and/or a recommendation to remove some cargo. In other examples, the indication of misalignment may indicate a recommendation to check and/or adjust a leveling suspension system of the example vehicle 12 to accommodate for the excessive vertical change. If the example vehicle restraint interface 464 determines that the vehicle 12 is still locked to the loading dock 16 (block 5120), then control returns to block 5112 to continue to monitor for changes in the orientation of the vehicle. However, when the example vehicle restraint interface 464 determines that the vehicle 12 is unlocked from the loading dock 16 (block 5120), the example program 5100 ends.

Figure 52:
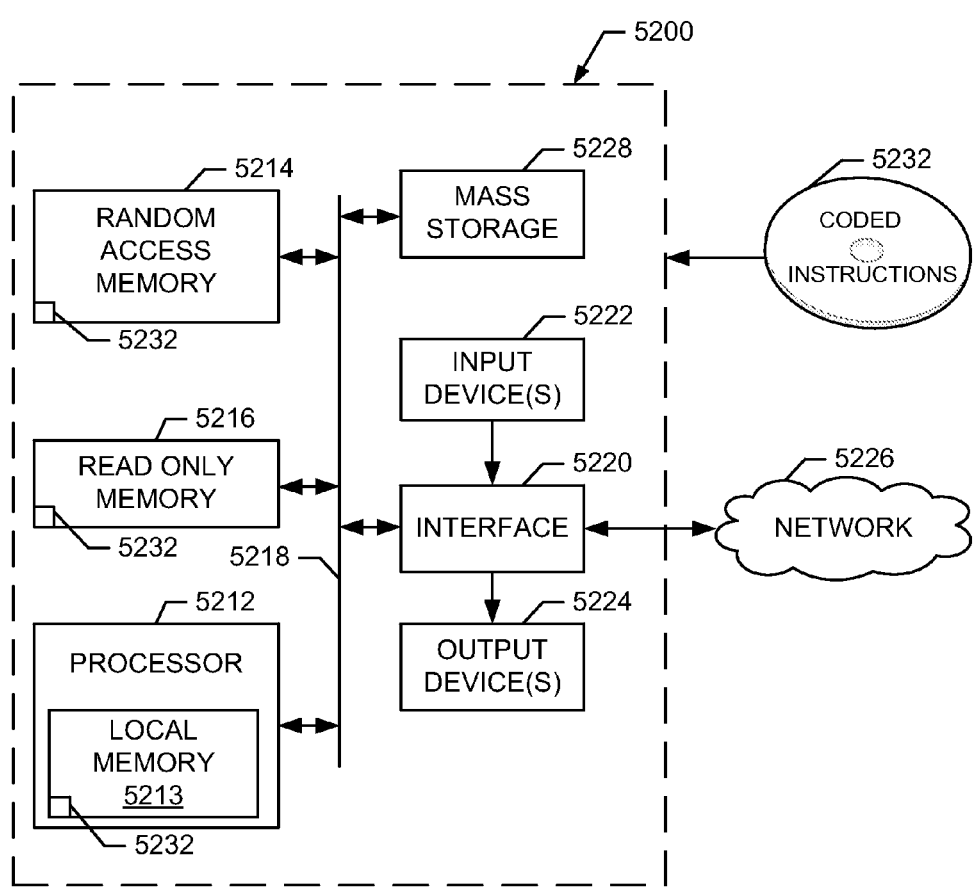
FIG. 52 is a schematic illustration of an example processor platform that may execute the instructions of FIGS. 46-51 to implement the example vehicle alignment manager of FIG. 45.

FIG. 52 is a block diagram of an example processor platform 5200 capable of executing the instructions of FIGS. 46-51 to implement the vehicle alignment manager 450 of FIG. 45. The processor platform 5200 can be, for example, a server, a personal computer, a mobile device (e.g., a cell phone, a smart phone, a tablet such as an iPad™), a personal digital assistant (PDA), an Internet appliance, or any other type of computing device.

The processor platform 5200 of the illustrated example includes a processor 5212. The processor 5212 of the illustrated example is hardware. For example, the processor 5212 can be implemented by one or more integrated circuits, logic circuits, microprocessors or controllers from any desired family or manufacturer.

The processor 5212 of the illustrated example includes a local memory 5213 (e.g., a cache). The processor 5212 of the illustrated example is in communication with a main memory including a volatile memory 5214 and a non-volatile memory 5216 via a bus 5218. The volatile memory 5214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 5216 may be implemented by flash memory and/or any other desired type of memory device. Access to the main memory 5214, 5216 is controlled by a memory controller.

The processor platform 5200 of the illustrated example also includes an interface circuit 5220. The interface circuit 5220 may be implemented by any type of interface standard, such as an Ethernet interface, a universal serial bus (USB), and/or a PCI express interface.

In the illustrated example, one or more input devices 5222 are connected to the interface circuit 5220. The input device(s) 5222 permit(s) a user to enter data and commands into the processor 5212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 5224 are also connected to the interface circuit 5220 of the illustrated example. The output devices 5224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 5220 of the illustrated example, thus, typically includes a graphics driver card, a graphics driver chip or a graphics driver processor.

The interface circuit 5220 of the illustrated example also includes a communication device such as a transmitter, a receiver, a transceiver, a modem and/or network interface card to facilitate exchange of data with external machines (e.g., computing devices of any kind) via a network 5226 (e.g., an Ethernet connection, a digital subscriber line (DSL), a telephone line, coaxial cable, a cellular telephone system, etc.).

The processor platform 5200 of the illustrated example also includes one or more mass storage devices 5228 for storing software and/or data. Examples of such mass storage devices 5228 include floppy disk drives, hard drive disks, compact disk drives, Blu-ray disk drives, RAID systems, and digital versatile disk (DVD) drives.

The coded instructions 5232 of FIGS. 46-51 may be stored in the mass storage device 5228, in the volatile memory 5214, in the non-volatile memory 5216, and/or on a removable tangible computer readable storage medium such as a CD or DVD.

At least some of the aforementioned examples include one or more features and/or benefits including, but not limited to, the following:

In some examples, a vehicle alignment system to monitor a vehicle at a loading dock includes an inner sensor pair to detect a surface of the vehicle. In some such examples, the inner sensor pair obtains a first feedback signal representative of a spatial orientation of the detected surface relative to a reference as the vehicle approaches a doorway of the loading dock. An outer sensor pair detects the surface of the vehicle, where the outer sensor pair obtains a second feedback signal representative of the spatial orientation of the detected surface relative to the reference as the vehicle approaches the doorway of the loading dock. A controller detects a threshold deviation in the spatial orientation of the detected surface of the vehicle relative to the reference based on at least one of the first feedback signal of the second feedback signal. A display varies an output signal in response to the detected threshold deviation in the spatial orientation of the detected surface relative to the reference.

In some examples, the first feedback signal provides an indication of a misalignment of the vehicle relative to a reference when a first sensor of the inner sensor pair is interrupted and a second sensor of the inner sensor pair is uninterrupted.

In some examples, the second feedback signal provides an indication of a misalignment of the vehicle relative to the reference when a first sensor of the outer sensor pair is interrupted and a second sensor of the outer sensor pair is uninterrupted.

In some examples, the spatial orientation includes a lateral orientation, and the controller compares at least one of the first feedback signal or the second feedback signal to a lateral orientation threshold, and varies a blinking frequency of a light of the display in response to an extent to which the lateral orientation of the vehicle deviates from the lateral orientation threshold.

In some examples, the spatial orientation comprises a lateral orientation, and the controller compares at least one of the first feedback signal or the second feedback signal to a lateral orientation threshold, and varies in color a light of the display in response to an extent to which the lateral orientation of the vehicle deviates from a target orientation value.

In some examples, the display includes a light to provide a visual illusion of movement that is to vary based on the spatial orientation.

In some examples, the display includes a rotational direction arrow that is to indicate the spatial orientation.

In some examples, the surface of the vehicle comprises a rear surface of the vehicle.

In some examples, a vehicle alignment system for monitoring a vehicle at a loading dock includes a sensor system to detect a RIG of the vehicle, where the sensor system obtains a feedback signal representative of a lateral position of the RIG relative to a reference as the vehicle approaches a doorway of the loading dock. In some examples, a controller detects a threshold deviation in the lateral position of the RIG relative to the reference based on the feedback signal. In some examples, a display generates an indication representative of the deviation in the lateral position of the RIG relative to the reference based on the feedback signal.

In some examples, the sensor system comprises at least one sensor mounted to a device that follows a vertical height of the RIG.

In some examples, the device comprises a vehicle restraint.

In some examples, the sensor system includes at least one sensor having a variable elevation corresponding to changes in elevation of the RIG.

In some examples, the controller compares the feedback signal to a lateral orientation threshold.

In some examples, the controller a blinking frequency of a light of the display in response to an extent to which the lateral position of the RIG deviates from a lateral position threshold.

In some examples, the controller compares the feedback signal to a lateral position threshold, and varies in color a light of the display in response to an extent to which the lateral position deviates from the lateral position threshold.

In some examples, the display includes a light to provide a visual illusion of movement that is to vary based on the lateral position of the RIG.

In some examples, a vehicle alignment system for monitoring a vehicle at a loading dock includes a camera to detect the vehicle approaching a doorway of a loading dock. The camera generates an image signal indicative of at least one of an angular orientation of the vehicle relative to a first reference or a lateral position of the vehicle relative to a second reference, where the first reference is different than the second reference. A controller detects a deviation in the at least one of the angular orientation of the vehicle relative to the first reference or the lateral position of the vehicle relative to the second reference based on the image signal. A display generates an indication representative of the at least one of the angular orientation of the vehicle relative to the first reference or the lateral position of the vehicle relative to the second reference.

In some examples, the controller compares the image signal to at least one of an angular orientation threshold or a lateral orientation threshold, and varies a blinking frequency of a light of the display in response to an extent to which the at least one of the lateral position of the vehicle or the angular orientation of the vehicle deviates from the respective lateral orientation threshold or the angular orientation threshold.

In some examples, the controller compares the image signal to at least one of an angular orientation threshold or a lateral orientation threshold, and varies in color a light of the display in response to an extent to which the at least one of the lateral position of the vehicle or the angular orientation of the vehicle deviates from the respective lateral orientation threshold or the angular orientation threshold.

In some examples, the display includes a light providing a visual illusion of movement that is to vary based on the at least one of the lateral position of the vehicle or the angular orientation of the vehicle.

In some examples, a method to monitor a vehicle at a loading dock includes detecting a RIG of a vehicle approaching a doorway of the loading dock. The method also includes providing a feedback signal in response to sensing the RIG, communicating the feedback signal to a controller, and determining, via the controller, at least one of an angular orientation of the RIG or a lateral position of the RIG relative to a reference, based on the feedback signal.

In some examples, the method includes comparing at least one of an angular orientation of the RIG or a lateral position of the RIG relative to the reference.

In some examples, based on the comparison, the method includes displaying a first signal indicating that the at least one of an angular orientation of RIG or the lateral position of the RIG is within an alignment threshold.

In some examples, the based on the comparison, the method includes displaying a second signal indicating that the at least one of the angular orientation of the RIG or the lateral position of the RIG is outside the alignment threshold.

In some examples, comparing the at least one of the angular orientation of the RIG or the lateral position of the RIG to the reference comprises comparing the feedback signal to a Cartesian coordinate axis to determine if the at least one of the angular orientation of the RIG or the lateral position of the RIG is outside an alignment threshold.

In some examples, a vehicle alignment system for monitoring a vehicle at a loading dock includes a sensor system to detect a RIG of the vehicle. In some examples, the sensor system obtains a feedback signal representative of an angular orientation of the RIG relative to a reference as the vehicle approaches a doorway of the loading dock. In some examples, a controller detects a threshold deviation in the angular orientation of the RIG relative to the reference based on the feedback signal. In some examples, a display generates an indication representative of the deviation in the angular orientation of the RIG relative to the reference based on the feedback signal.

In some examples, the sensor system includes at least one sensor mounted to a device that follows a vertical height of the RIG.

In some examples, the device includes a vehicle restraint.

In some examples, the sensor system includes at least one sensor having a variable elevation corresponding to changes in elevation of the RIG.

In some examples, the controller compares the feedback signal to an angular orientation threshold, and varies a blinking frequency of a light of the display in response to an extent to which the angular orientation of the RIG deviates from the angular orientation threshold.

In some examples, the controller compares the feedback signal to an angular orientation threshold, and varies in color a light of the display in response to an extent to which the angular orientation deviates from the angular orientation threshold.

In some examples, the display includes a light to provide a visual illusion of movement that is to vary based on the angular orientation of the RIG.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle alignment system for monitoring a vehicle at a loading dock, the vehicle alignment system comprising:
    a sensor to be positioned between lateral sides of a doorway of the loading dock, the sensor to sense between a first perimeter lateral edge and a second perimeter lateral edge of a RIG of the vehicle, the sensor to provide a feedback signal representative of a spatial orientation of the RIG relative to a reference as the vehicle approaches the doorway of the loading dock;
    a processor to detect a threshold deviation in the spatial orientation of the RIG relative to the reference by comparing the feedback signal and the reference; and
    a display to generate an indication representative of the deviation in the spatial orientation of the RIG relative to the reference.

2. The vehicle alignment system of claim 1, wherein the sensor comprises at least one sensor mounted to a device that follows a vertical height of the RIG.

3. The vehicle alignment system of claim 2, wherein the device comprises a vehicle restraint.

4. The vehicle alignment system of claim 1, wherein the sensor includes at least one sensor having a variable elevation corresponding to changes in elevation of the RIG.

5. The vehicle alignment system of claim 1, wherein the reference includes a lateral orientation threshold and the spatial orientation includes a lateral position of the RIG, and wherein the processor is to:
    compare the feedback signal to the lateral orientation threshold; and
    vary a blinking frequency of a light of the display in response to an extent to which the lateral position of the RIG deviates from the lateral position threshold.

6. The vehicle alignment system of claim 1, wherein the reference includes a lateral orientation threshold and the spatial orientation includes a lateral position of the RIG, and wherein the processor is to:
    compare the feedback signal to the lateral position threshold; and
    vary in color a light of the display in response to an extent to which the lateral position deviates from the lateral position threshold.

7. The vehicle alignment system of claim 1, wherein the display includes a light to provide a visual illusion of movement that is to vary based on the spatial orientation of the RIG.

8. The vehicle alignment system of claim 1, wherein the sensor includes only one sensor, the sensor to project a first beam adjacent the first perimeter lateral edge of the RIG and a second beam adjacent the second perimeter lateral edge of the RIG, the processor to detect at least one of a lateral alignment or an angular alignment of the RIG by comparing a symmetry between a field of view of the first beam relative to the reference and a field of view of the second beam relative to the reference.

9. The vehicle alignment system of claim 1, wherein the sensor includes a first plurality of sensors and a second plurality of sensors, the first plurality of sensors positioned symmetrically relative to a centerline of the doorway, the first sensors to detect the RIG relative to a first side of the reference and the second sensors to detect the RIG relative to a second side of the reference.

10. The vehicle alignment system of claim 9, wherein the processor detects a lateral alignment relative to the reference when an equal number of first sensors and second sensors are in a triggered state, and the processor to detect a lateral misalignment relative to the reference when an unequal number of first sensors and second sensors are in a triggered state.

11. A method to monitor a vehicle at a loading dock, the method comprising:
sensing, via a sensor positioned between lateral sides of a doorway, between a first perimeter lateral edge and a second perimeter lateral edge of a RIG of a vehicle approaching the doorway to detect a position of the RIG relative to a reference;
providing a feedback signal representative of the detected position in response to sensing the RIG;
communicating the feedback signal to a controller; and
determining, by executing an instruction with at least one processor, at least one of an angular orientation of the RIG or a lateral position of the RIG relative to the reference based on the feedback signal.

12. The method of claim 11, further comprising comparing the feedback signal relative to the reference to determine the at least one of the angular orientation or the lateral position.

13. The method of claim 12, wherein based on the comparison, displaying a first signal indicating that the at least one of the angular orientation of RIG or the lateral position of the RIG is within an alignment threshold.

14. The method of claim 13, wherein based on the comparison, displaying a second signal indicating that the at least one of the angular orientation of the RIG or the lateral position of the RIG is outside the alignment threshold.

15. The method of claim 12, wherein the reference includes a Cartesian coordinate axis, the method further including comparing the feedback signal associated with at least one of the angular orientation of the RIG or the lateral position of the RIG to the Cartesian coordinate axis to determine if the at least one of the angular orientation of the RIG or the lateral position of the RIG is outside an alignment threshold.

16. A vehicle alignment system for monitoring a vehicle at a loading dock, the vehicle alignment system comprising:
a sensor positioned between lateral sides of a doorway of the loading dock, the sensor to sense a position of a RIG of the vehicle and provide a feedback signal representative of the sensed position;
a processor to compare the feedback signal to an angular threshold to detect a deviation in an angular orientation of the RIG relative to a reference as the vehicle approaches a doorway of the loading dock; and
a display to generate a directional indication representative of the deviation in the angular orientation of the RIG relative to the reference based on the feedback signal.

17. The vehicle alignment system of claim 16, wherein the sensor comprises at least one sensor mounted to a device that follows a vertical height of the RIG.

18. The vehicle alignment system of claim 17, wherein the device comprises a vehicle restraint.

19. The vehicle alignment system of claim 16, wherein the sensor includes at least one sensor having a variable elevation corresponding to changes in elevation of the RIG.

20. The vehicle alignment system of claim 16, wherein the processor is to:
compare the feedback signal to an angular orientation threshold; and
vary a blinking frequency of a light of the display in response to an extent to which the angular orientation of the RIG deviates from the angular orientation threshold.

21. The vehicle alignment system of claim 16, wherein the processor is to:
compare the feedback signal to an angular orientation threshold; and
vary in color a light of the display in response to an extent to which the angular orientation deviates from the angular orientation threshold.

22. The vehicle alignment system of claim 16, wherein the display includes a light to provide a visual illusion of movement that is to vary based on the angular orientation of the RIG.

23. The vehicle alignment system of claim 16, wherein the sensor is to sense a first distance between a first portion of the RIG of the vehicle relative to the loading dock and a second distance between a second portion of the RIG relative to the loading dock, the first portion being different than the second portion, the sensor to provide the feedback signal representative of the first distance and the second distance.

24. The vehicle alignment system of claim 23, wherein the processor is to calculate a difference between the first distance and the second distance and compare the calculated difference to the angular threshold to detect the angular orientation of the RIG relative to the reference as the vehicle approaches the doorway of the loading dock.

* * * * *